US 9,042,823 B2

(12) United States Patent
Palin et al.

(10) Patent No.: US 9,042,823 B2
(45) Date of Patent: May 26, 2015

(54) METHOD, APPARATUS, AND COMPUTER PROGRAM PRODUCT FOR WIRELESS SHORT-RANGE COMMUNICATION DISCONNECTION

(75) Inventors: Arto Palin, Viiala (FI); Vesa Luukkala, Espoo (FI)

(73) Assignee: Nokia Corporation, Espoo (FI)

( * ) Notice: Subject to any disclaimer, the term of this patent is extended or adjusted under 35 U.S.C. 154(b) by 407 days.

(21) Appl. No.: 13/491,021

(22) Filed: Jun. 7, 2012

(65) Prior Publication Data
US 2013/0331031 A1 Dec. 12, 2013

(51) Int. Cl.
*H04B 17/00* (2006.01)
*H04W 52/02* (2009.01)
*H04W 4/00* (2009.01)
*H04W 76/06* (2009.01)

(52) U.S. Cl.
CPC .......... *H04W 52/0245* (2013.01); *H04W 76/06* (2013.01); *Y02B 60/50* (2013.01); *H04B 17/318* (2015.01); *H04W 4/008* (2013.01)

(58) Field of Classification Search
USPC ............... 455/41.2, 67.11, 414.1, 421, 226.2, 455/67.7, 33.2, 74, 63, 33.1, 552.1, 410, 455/411; 370/252, 310, 341, 328, 311, 336, 370/331, 338, 428
See application file for complete search history.

(56) References Cited

U.S. PATENT DOCUMENTS

| | | | | |
|---|---|---|---|---|
| 5,193,216 | A | * | 3/1993 | Davis ........................... 455/421 |
| 5,471,671 | A | * | 11/1995 | Wang et al. ................ 455/226.2 |
| 5,732,347 | A | * | 3/1998 | Bartle et al. .................. 455/421 |
| 8,547,867 | B2 | * | 10/2013 | Koo et al. ..................... 370/252 |
| 2006/0258338 | A1 | * | 11/2006 | Markki et al. ............. 455/414.1 |
| 2008/0107054 | A1 | * | 5/2008 | Parts et al. ................... 370/310 |
| 2010/0035567 | A1 | * | 2/2010 | Vin ............................. 455/115.3 |
| 2010/0244587 | A1 | * | 9/2010 | Tiovola et al. ................ 307/130 |
| 2011/0022661 | A1 | * | 1/2011 | Alsina .......................... 709/205 |
| 2011/0319022 | A1 | * | 12/2011 | Arad et al. ................... 455/41.2 |
| 2012/0289160 | A1 | * | 11/2012 | Palin et al. .................. 455/41.2 |

OTHER PUBLICATIONS

Extended European Search Report for Application No. 13165068.1 dated Aug. 27, 2013.

* cited by examiner

*Primary Examiner* — Ganiyu A Hanidu
(74) *Attorney, Agent, or Firm* — Locke Lord LLP

(57) ABSTRACT

Method, apparatus, and computer program product example embodiments enable devices to disconnect a communication connection. In an example embodiment, a method includes measuring, by an apparatus, a power level of one or more wireless communication messages received from a selected wireless device over a wireless communication connection, after an interval following an establishment of the wireless communication connection; and disconnecting, by the apparatus, the wireless communication connection with the selected wireless device, if the one or more wireless communication messages received over the wireless communication connection, has a measured power level greater than a threshold value.

17 Claims, 9 Drawing Sheets

TIMING DURING A DEVICE DISCOVERY PROCESS, FOR EXAMPLE A BLUETOOTH INQUIRY PROCESS

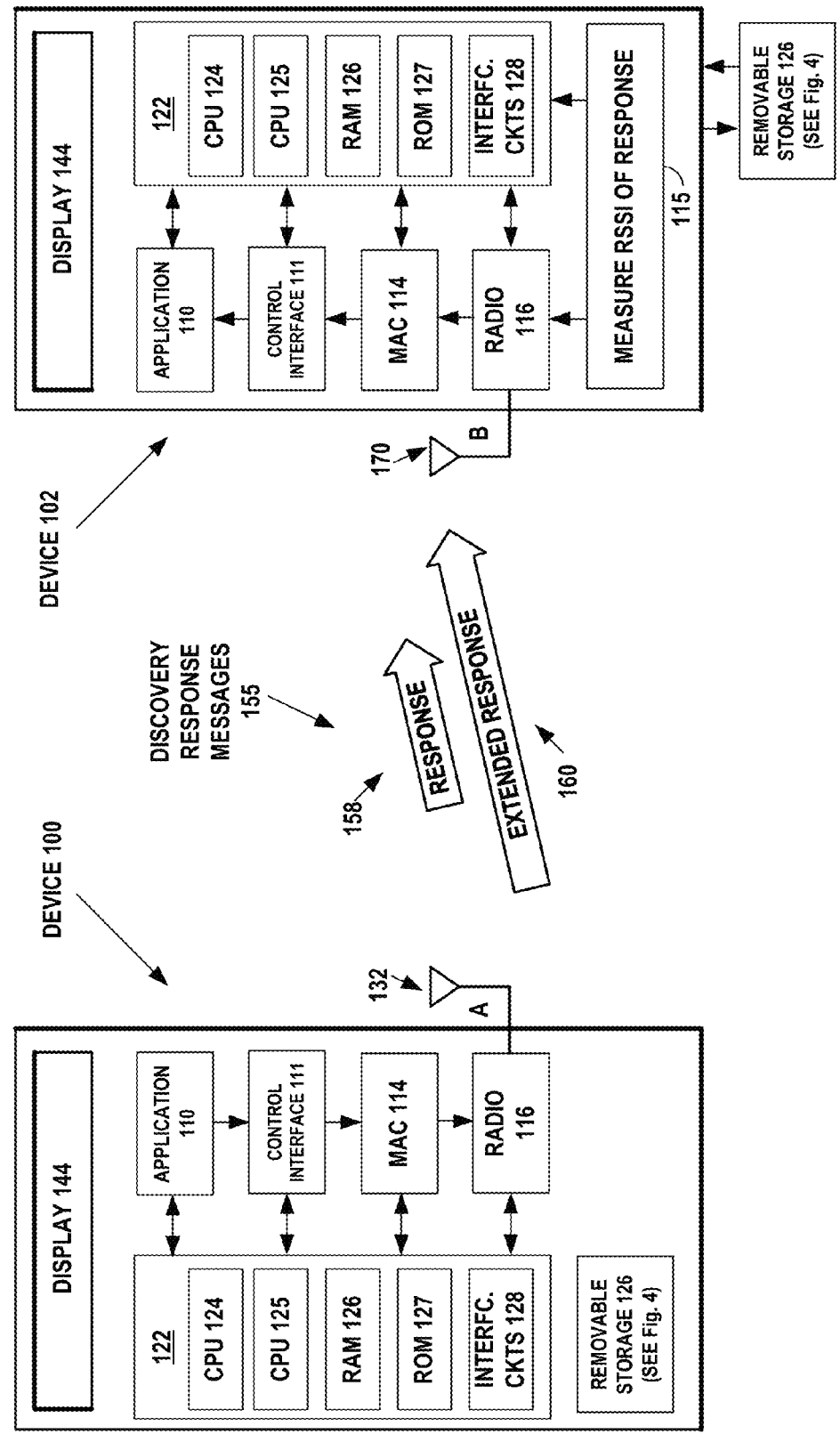

FIG. 1D

PROCESS IN DEVICE 102

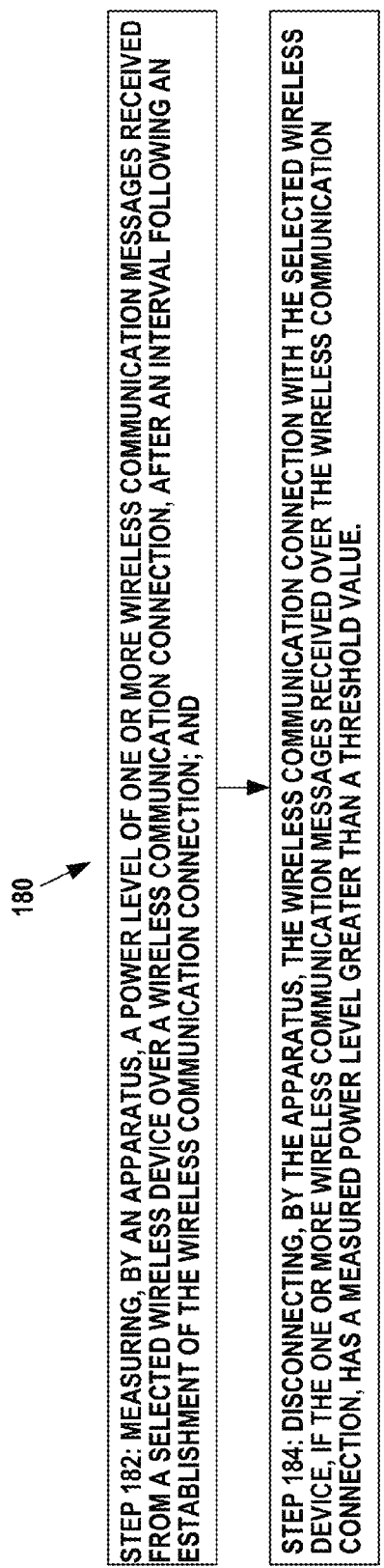

180

STEP 182: MEASURING, BY AN APPARATUS, A POWER LEVEL OF ONE OR MORE WIRELESS COMMUNICATION MESSAGES RECEIVED FROM A SELECTED WIRELESS DEVICE OVER A WIRELESS COMMUNICATION CONNECTION, AFTER AN INTERVAL FOLLOWING AN ESTABLISHMENT OF THE WIRELESS COMMUNICATION CONNECTION; AND

STEP 184: DISCONNECTING, BY THE APPARATUS, THE WIRELESS COMMUNICATION CONNECTION WITH THE SELECTED WIRELESS DEVICE, IF THE ONE OR MORE WIRELESS COMMUNICATION MESSAGES RECEIVED OVER THE WIRELESS COMMUNICATION CONNECTION, HAS A MEASURED POWER LEVEL GREATER THAN A THRESHOLD VALUE.

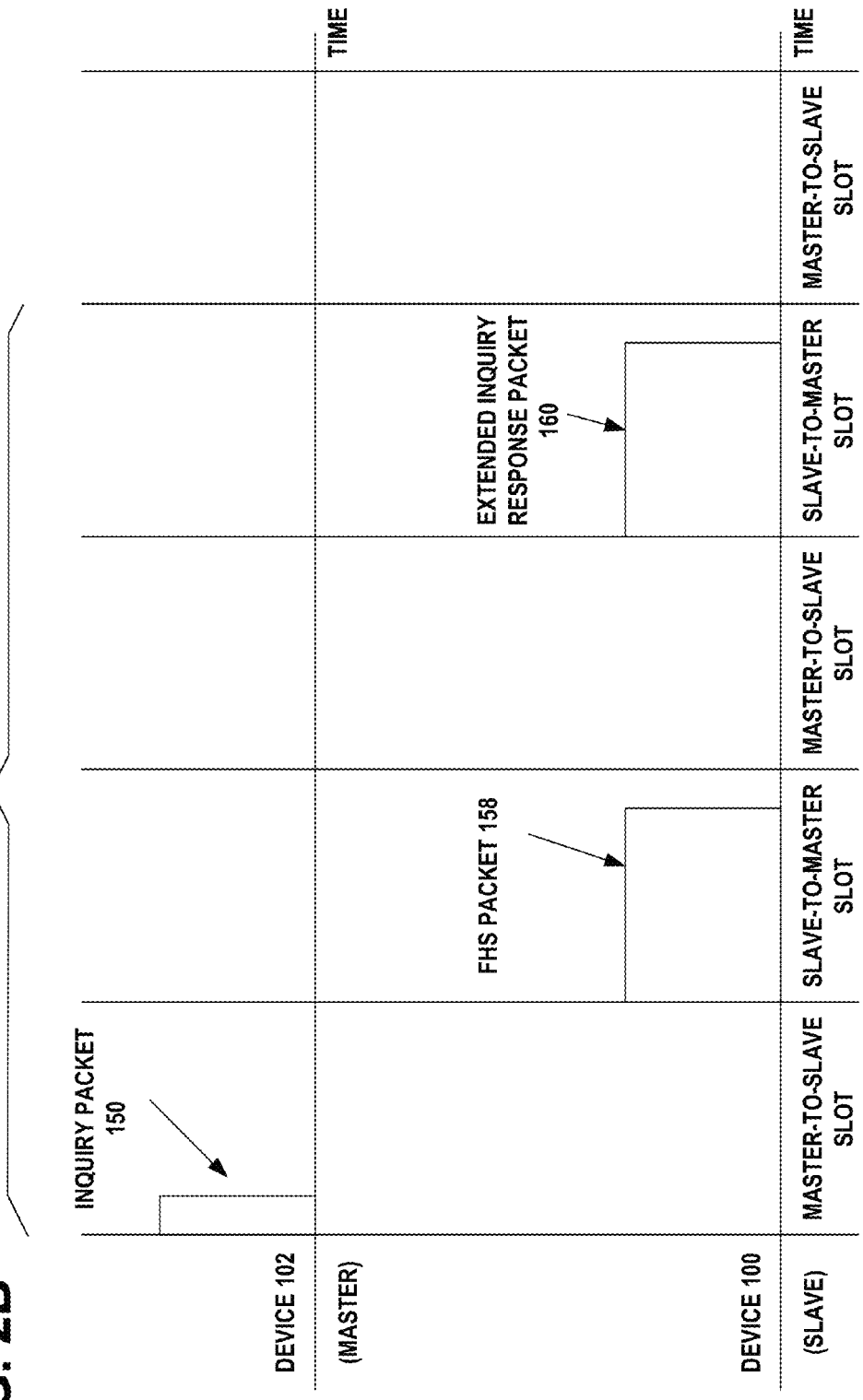

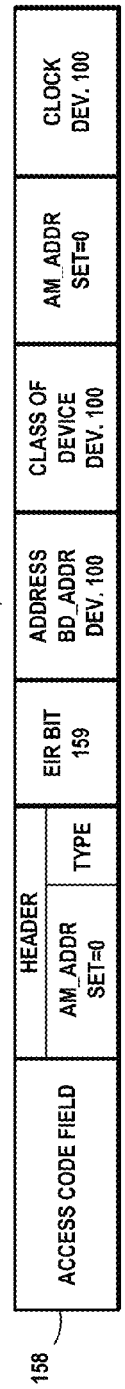
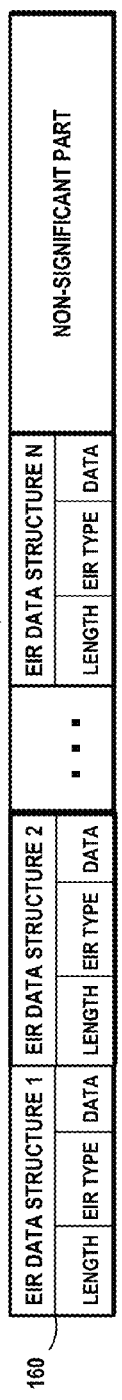
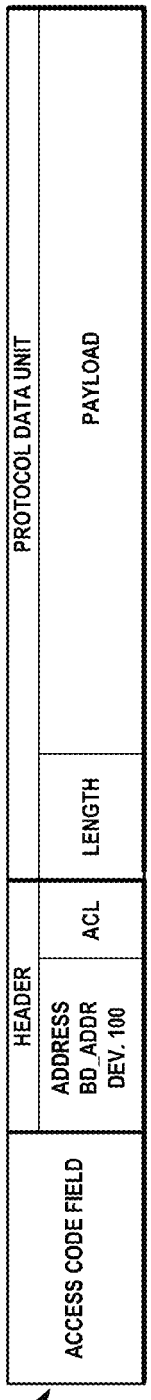

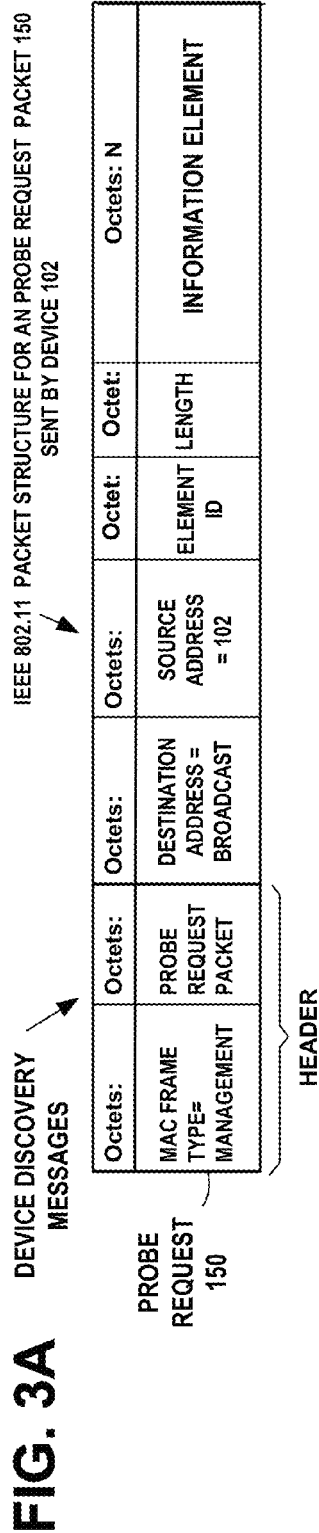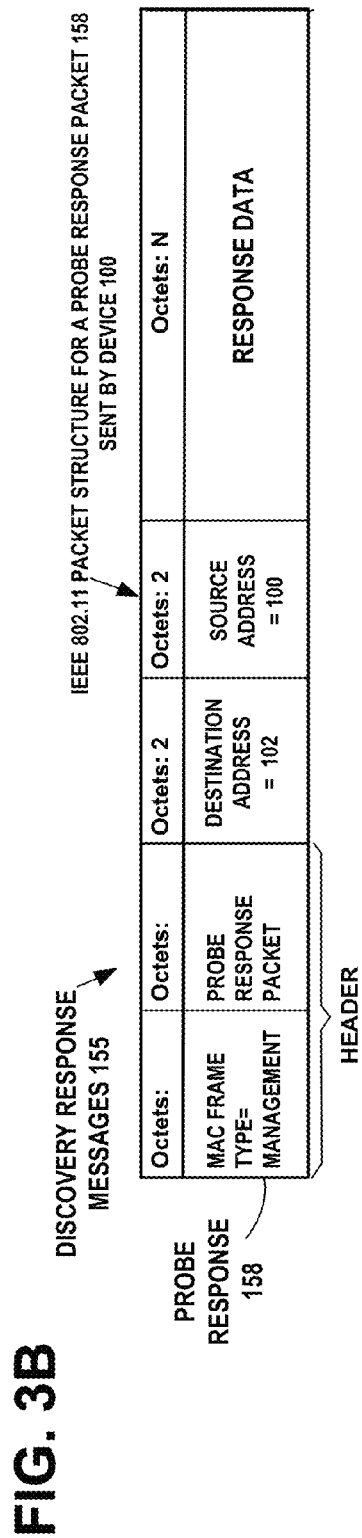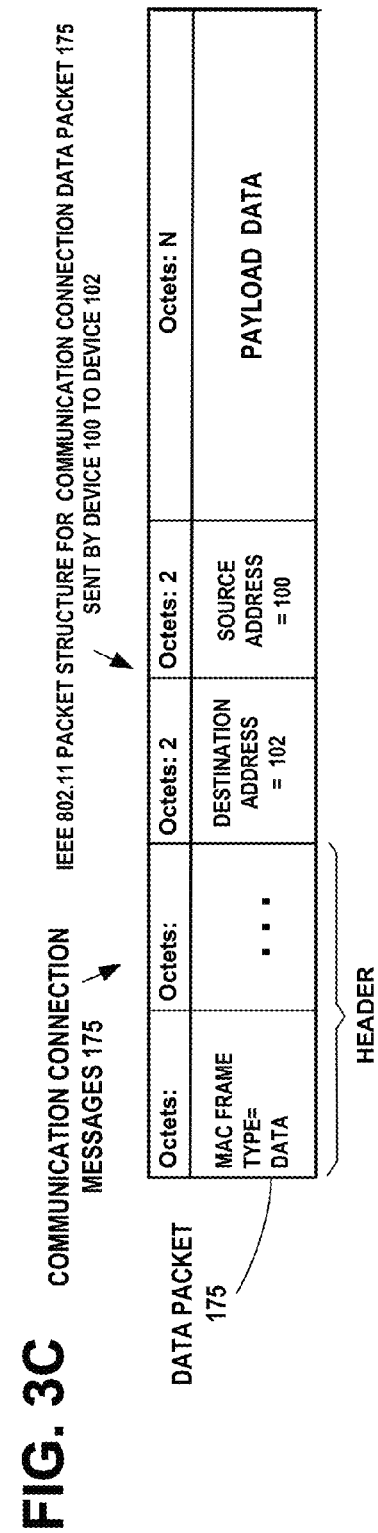
FIG. 3A
FIG. 3B
FIG. 3C

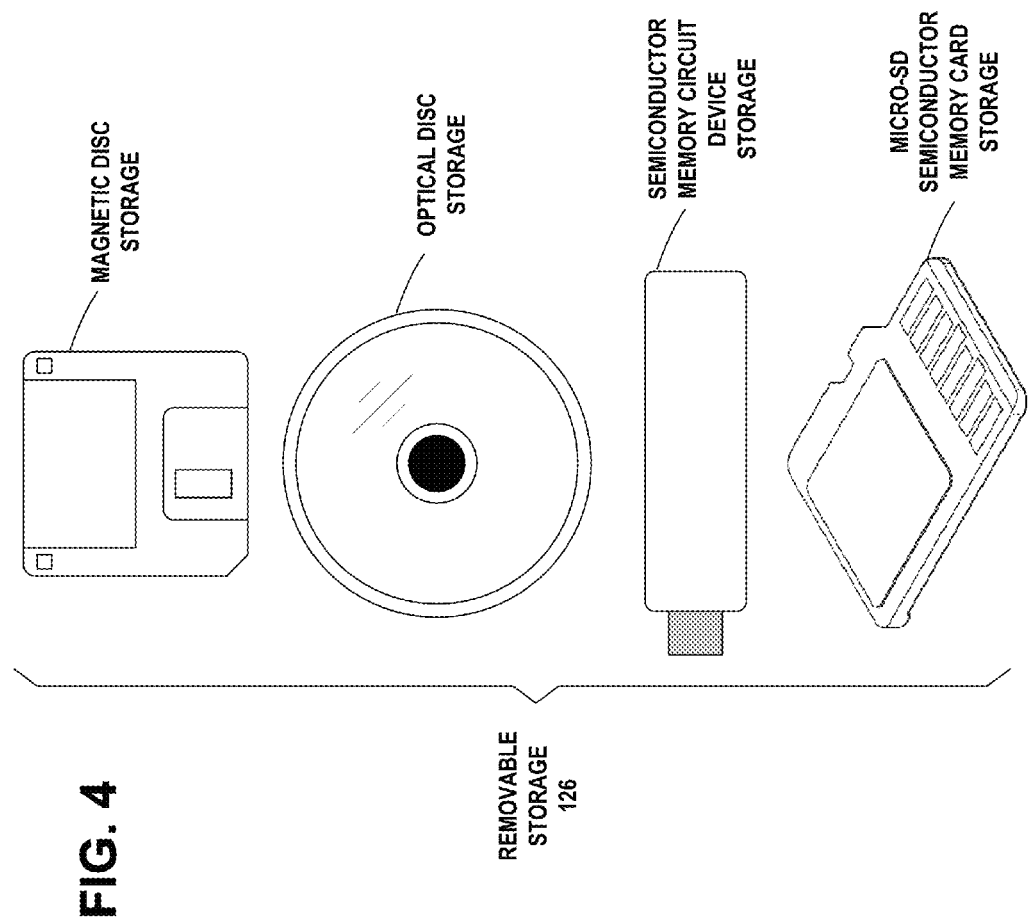

METHOD, APPARATUS, AND COMPUTER PROGRAM PRODUCT FOR WIRELESS SHORT-RANGE COMMUNICATION DISCONNECTION

FIELD

The technology field relates to wireless short-range communication disconnection.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. Bluetooth™ *Specification version 2.0+ EDR*, published Oct. 15, 2004 has the original functional characteristics of the first version Bluetooth™ Basic Rate (BR) and adds the Enhanced Data Rate (EDR) feature. Bluetooth™ *Specification version 2.1+ EDR*, published Jul. 26, 2007 for Basic Rate/Enhanced Data Rate (BR/EDR), added definitions for new features: Encryption Pause Resume, Erroneous Data reporting, Extended Inquiry Response, Link Supervision Timeout Event, Packet Boundary Flag, Secure Simple Pairing, Sniff Subrating. Bluetooth™ *Specification version 3.0+ HS*, published Apr. 21, 2009, updated the standard to integrate the Alternate MAC/PHY and Unicast Connectionless Data features.

The Bluetooth™ *Core Specification, Version* 4.0, Bluetooth™ SIG, Jun. 30, 2010 (incorporated herein by reference), includes the Extended Inquiry Response. An Extended Inquiry Response may be used to provide miscellaneous information during the inquiry response procedure. Data types may be defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information.

SUMMARY

Method, apparatus, and computer program product example embodiments enable devices to disconnect a communication connection.

An example embodiment of the invention includes a method comprising:

measuring, by an apparatus, a power level of one or more wireless communication messages received from a selected wireless device over a wireless communication connection, after an interval following an establishment of the wireless communication connection; and disconnecting, by the apparatus, the wireless communication connection with the selected wireless device, if the one or more wireless communication messages received over the wireless communication connection, has a measured power level greater than a threshold value.

An example embodiment of the invention includes a method comprising:

measuring, by the apparatus, a power level of one or more wireless response messages received from one or more wireless devices responding to one or more wireless device discovery messages broadcast by the apparatus; and establishing, by the apparatus, the wireless communication connection with the selected wireless device, the selected wireless device being one of the one or more responding wireless devices, if the one or more wireless response messages received from the selected wireless device has a measured power level greater than a threshold value.

An example embodiment of the invention includes a method comprising:

storing an identity of the wireless communication connection after selecting the one of the one or more responding wireless devices, to enable identifying the wireless communication connection of the selected wireless device when measuring the power level of the received one or more wireless communication messages.

An example embodiment of the invention includes a method comprising:

wherein the interval for delaying the measuring of the power level is timed by a timer.

An example embodiment of the invention includes a method comprising:

delaying the measuring of the power level of the one or more wireless communication messages until after the measured power level is less than a threshold value.

An example embodiment of the invention includes a method comprising:

wherein the wireless communication connection is one of a Bluetooth connection or an IEEE 802.11 connection.

An example embodiment of the invention includes a method comprising:

storing a first connection handle associated with the wireless communication connection after selecting the one of the one or more responding wireless devices, and starting a second connection handle referenced to the wireless communication connection, for association with the measuring the power level of the received one or more wireless communication messages.

An example embodiment of the invention includes a method comprising:

wherein the threshold value for establishing the wireless communication connection and the threshold value for disconnecting the wireless communication connection are the same.

An example embodiment of the invention includes a method comprising:

wherein the threshold value for establishing the wireless communication connection and the threshold value disconnecting the wireless communication connection are referenced with respect to a preferred receive power range.

An example embodiment of the invention includes an apparatus comprising:

at least one processor;

at least one memory including computer program code;

the at least one memory and the computer program code configured to, with the at least one processor, cause the apparatus at least to:

measure a power level of one or more wireless communication messages received from a selected wireless device over a wireless communication connection, after an interval following an establishment of the wireless communication connection; and disconnect the wireless communication connection with the selected wireless device, if the one or more wireless communication messages received over the wireless communication connection, has a measured power level greater than a threshold value.

An example embodiment of the invention includes an apparatus comprising:

the at least one memory and the computer program code configured to, with the at least one processor, cause the apparatus at least to:

measure a power level of one or more wireless response messages received from one or more wireless devices responding to one or more wireless device discovery messages broadcast by the apparatus; and establish the wireless communication connection with the selected wireless device, the selected wireless device being one of the one or more responding wireless devices, if the one or more wireless response messages received from the selected wireless device has a measured power level greater than a threshold value.

An example embodiment of the invention includes an apparatus comprising:

the at least one memory and the computer program code configured to, with the at least one processor, cause the apparatus at least to:

store an identity of the wireless communication connection after selecting the one of the one or more responding wireless devices, to enable identifying the wireless communication connection of the selected wireless device when measuring the power level of the received one or more wireless communication messages.

An example embodiment of the invention includes an apparatus comprising:

wherein the interval for delaying the measuring of the power level is timed by a timer.

An example embodiment of the invention includes an apparatus comprising:

the at least one memory and the computer program code configured to, with the at least one processor, cause the apparatus at least to:

delay the measuring of the power level of the one or more wireless communication messages until after the measured power level is less than a threshold value.

An example embodiment of the invention includes an apparatus comprising:

wherein the wireless communication connection is one of a Bluetooth connection or an IEEE 802.11 connection.

An example embodiment of the invention includes an apparatus comprising:

the at least one memory and the computer program code configured to, with the at least one processor, cause the apparatus at least to:

store a first connection handle associated with the wireless communication connection after selecting the one of the one or more responding wireless devices, and start a second connection handle referenced to the wireless communication connection, for association with the measuring the power level of the received one or more wireless communication messages.

An example embodiment of the invention includes an apparatus comprising:

wherein the threshold value for establishing the wireless communication connection and the threshold value for disconnecting the wireless communication connection are the same.

An example embodiment of the invention includes an apparatus comprising:

wherein the threshold value for establishing the wireless communication connection and the threshold value disconnecting the wireless communication connection are referenced with respect to a preferred receive power range.

An example embodiment of the invention includes a computer program product comprising computer executable program code recorded on a computer readable, non-transitory storage medium, the computer executable program code comprising:

code for measuring, by an apparatus, a power level of one or more wireless communication messages received from a selected wireless device over a wireless communication connection, after an interval following an establishment of the wireless communication connection; and code for disconnecting, by the apparatus, the wireless communication connection with the selected wireless device, if the one or more wireless communication messages received over the wireless communication connection, has a measured power level greater than a threshold value.

DESCRIPTION OF THE FIGURES

FIG. 1B is an illustration of an example embodiment of the network of FIG. 1A, in the device discovery phase, wherein the first device has received from the second wireless device one or more wireless response messages responding to the discovery messages, the first device measuring the power level of the wireless response messages, selecting the second device if the one or more wireless response messages received from the second wireless device has a measured power level greater than a first threshold value, and establishing a wireless communication connection with the second device, in accordance with at least one embodiment of the present invention.

FIG. 1D is an illustration of an example flow diagram of an example process in the first device 102 carrying out the example operations in the device discovery phase and the connection phase shown in FIGS. 1A, 1B, and 1C, in accordance with at least one embodiment of the present invention.

FIG. 2B is an illustration of an example timing diagram of the device discovery process, using the Bluetooth communications standard, in accordance with at least one embodiment of the present invention.

FIG. 2C is an illustration of an example message format for device discovery messages, using the Bluetooth communications standard, in accordance with at least one embodiment of the present invention.

FIG. 2D is an illustration of an example message format for discovery response messages, using the Bluetooth communications standard, in accordance with at least one embodiment of the present invention.

FIG. 2E is an illustration of an example message format for extended discovery response messages, using the Bluetooth communications standard, in accordance with at least one embodiment of the present invention.

FIG. 2F is an illustration of an example message format for communication connection messages, using the Bluetooth communications standard, in accordance with at least one embodiment of the present invention.

FIG. 3A is an illustration of an example message format for device discovery messages, using the IEEE 802.11 communications standard, in accordance with at least one embodiment of the present invention.

FIG. 3B is an illustration of an example message format for discovery response messages, using the IEEE 802.11 communications standard, in accordance with at least one embodiment of the present invention.

FIG. 3C is an illustration of an example message format for communication connection messages, using the IEEE 802.11 communications standard, in accordance with at least one embodiment of the present invention.

FIG. 4 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Figure 1A:
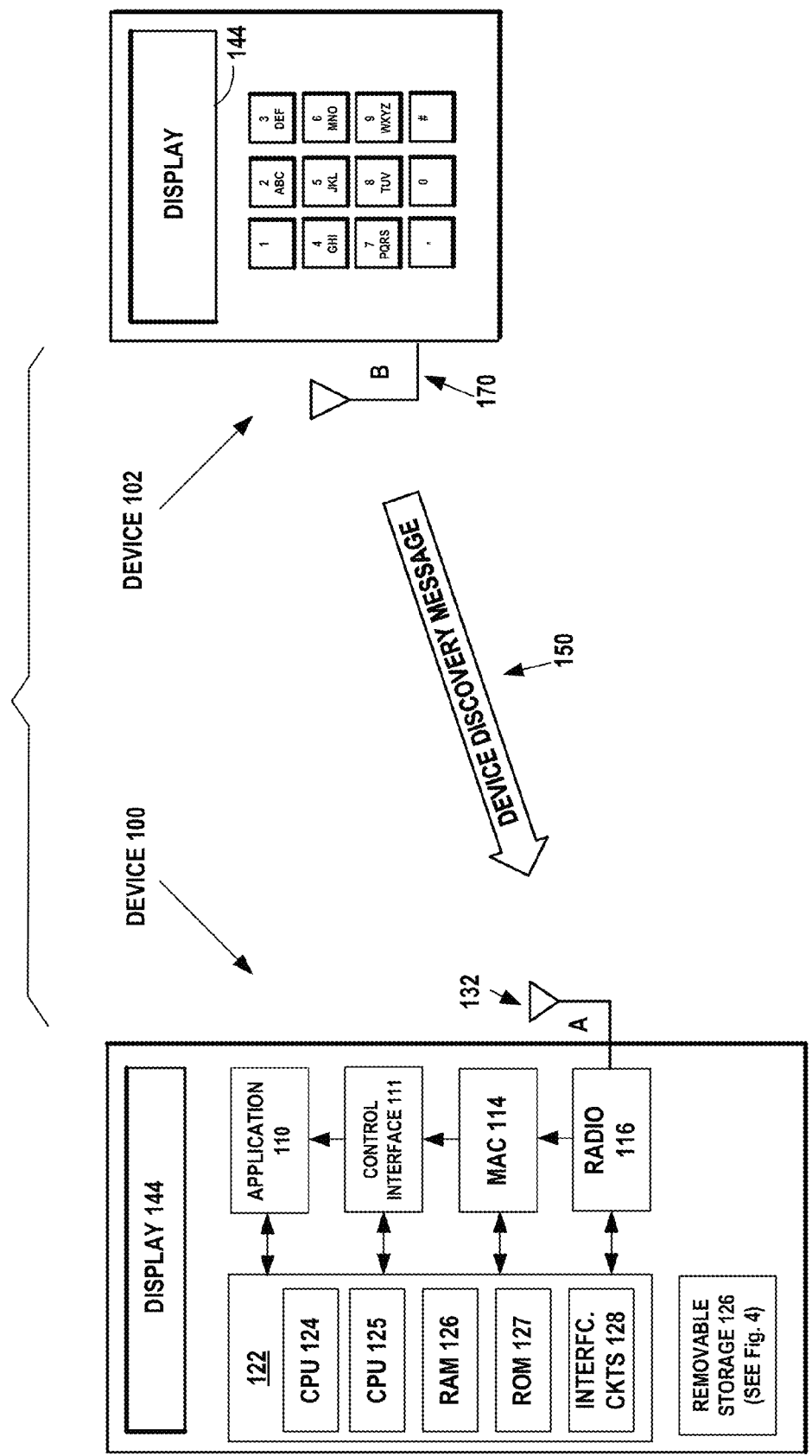
FIG. 1A is an illustration of an example embodiment of a network in a device discovery phase, with a first device broadcasting one or more wireless device discovery messages to one or more wireless devices, including a second wireless device, in accordance with at least one embodiment of the present invention.

DISCUSSION OF EXAMPLE EMBODIMENTS
OF THE INVENTION

This section is organized into the following topics:
A. Wireless Short-Range Communication Networks
B. Connection Formation Between Bluetooth™ Devices
C. Touch to Select in Bluetooth Technology
D. Connection Formation Between IEEE 802.11 WLAN Devices
E. Wireless Short-Range Communication Disconnection
A. Wireless Short-Range Communication Networks Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), Ultra Wide-band (UWB), Zig-Bee (IEEE 802.15.4, IEEE 802.15.4a), and near field communication technologies, such as radio frequency identification (RFID) and near field communication (NFC) technology that enable contactless identification and interconnection of wireless devices. Bluetooth Technology provides an example of wireless short-range communication establishment.

B. Connection Formation Between Bluetooth™ Devices

A procedure for forming connections between Bluetooth™ devices is described in the Bluetooth™ Specification, Version 4, Jun. 30, 2010. The Bluetooth™ Baseband is the part of the Bluetooth™ system that implements the Media Access Control (MAC) and physical layer procedures to support the connection formation, exchange of data information streams, and ad hoc networking between Bluetooth™ devices. Connection formation includes inquiry, inquiry scanning, inquiry response, paging, page scanning, and page response procedures.

1. Inquiry

Inquiry is a procedure where a Bluetooth™ device transmits inquiry messages and listens for responses in order to discover the other Bluetooth™ devices that are within the coverage area. Bluetooth™ devices use the inquiry procedure to discover nearby devices, or to be discovered by devices in their locality. A Bluetooth™ device that tries to find other nearby devices is known as an inquiring device and actively sends inquiry requests. Bluetooth™ devices that are available to be found are known as discoverable devices, listen or scan for these inquiry requests, and send responses. The inquiry procedure uses dedicated physical channels for the inquiry requests and responses. The inquiry procedure does not make use of any of the architectural layers above the physical channel, although a transient physical link may be considered to be present during the exchange of inquiry and inquiry response information.

Bluetooth™ devices communicate with one another over a total bandwidth of 80 MHz divided into 79 physical channels of 1 MHz each. An inquiring device wanting to discover other devices repetitively probes a first set of 16 frequencies, probing two frequencies every 625 microseconds. It repeats this at least 256 times. Then, it repetitively probes a second set of 16 frequencies. The inquiring device will repeat entire cycle at least two times. Of the 79 radio carriers, 32 are considered wake-up carriers and the inquiring device broadcasts inquiry packets on these 32 carrier frequencies.

During the inquiry procedure, the inquiring device or master transmits inquiry messages with the general or dedicated inquiry access code. The timing for inquiry is the same as for paging. The identity or ID packet consists of the inquiry access code (IAC). It has a fixed length of 68 bits. The receiver uses a bit correlator to match the received packet to the known bit sequence of the ID packet. In order to discover other devices a device may enter inquiry substate. In this substate, it may repeatedly transmit the inquiry message (ID packet) at different hop frequencies. The inquiry hop sequence is derived from the Lower Address Part (LAP) of the General Inquiry Access Code (GIAC). Thus, even when dedicated inquiry access codes (DIACs) are used, the applied hopping sequence is generated from the GIAC LAP. A device that allows itself to be discovered, may regularly enter the inquiry scan substate to respond to inquiry messages. The inquiry response is optional: a device is not forced to respond to an inquiry message. During the inquiry substate, the discovering device collects the Bluetooth™ device addresses and clocks of all devices that respond to the inquiry message. In addition, the discovering device also collects extended information (e.g. local name and supported services) from devices that respond with an extended inquiry response packet. It may then, if desired, make a connection to any one of the discovered devices by means of the page procedure described below.

The inquiry message broadcast by the source does not contain any information about the source. However, it may indicate which class of devices should respond. There is one general inquiry access code (GIAC) to inquire for any device, and 63 values have been reserved as dedicated inquiry access codes (DIAC) that only inquire for a certain type of device. The inquiry access codes are derived from reserved Bluetooth™ device addresses. There is only one DIAC defined in the Bluetooth™ Specification, and it is called the Limited Inquiry Access Code (LIAC). The LIAC is only intended to be used for limited time periods in scenarios where both devices have been explicitly caused to enter this state, usually by user action.

Inquiry scan is a procedure where a Bluetooth™ device listens for inquiry messages received on its inquiry scan physical channel. A device using one of its inquiry scan channels changes the inquiry channel every 1.28 s until it receives an inquiry message on a the current channel from another Bluetooth™ device. This is identified by the appropriate inquiry access code. The inquiry scanning device will then follow the inquiry response procedure to return a response to the inquiring device. The inquiry scan substate is very similar to the page scan substate. However, instead of scanning for the device's device access code, the receiver may scan for the inquiry access code long enough to completely scan for 16 inquiry frequencies. The inquiry procedure uses 32 dedicated inquiry hop frequencies according to the inquiry hopping sequence. These frequencies are determined by the general inquiry address. The phase is determined by the native clock of the device carrying out the inquiry scan. Instead of, or in addition to, the general inquiry access code, the device may scan for one or more dedicated inquiry access codes. However, the scanning may follow the inquiry scan hopping sequence determined by the general inquiry address. The inquiry scan interval may be less than or equal to 2.56 s.

2. Inquiry Response

An inquiry response packet (FHS) is transmitted from the inquiry scanning device or slave to the master after the slave has received an inquiry message. This packet contains information necessary for the inquiring master to page the slave and follows 625 microseconds after the receipt of the inquiry message. The inquiry response packet is received by the master at the hop frequency when the inquiry message received by the slave was first in the master-to-slave slot. The slave response substate for inquiries differs completely from the slave response substate applied for pages. When the inquiry message is received in the inquiry scan substate, the recipient may return an inquiry response (FHS) packet containing the recipient's device address (BD_ADDR) and other parameters. If the recipient has non-zero extended inquiry response data to send, it may return an extended inquiry response packet after the FHS packet. On the first inquiry message received in the inquiry scan substate the slave may enter the inquiry response substate. If the slave has non-zero extended inquiry response data to send it may return an FHS packet, with the extended inquiry response bit set to one, to the master 625 microseconds after the inquiry message was received. It may then return an extended inquiry response packet 1250 microseconds after the start of the FHS packet. If the slave's extended inquiry response data is all zeroes the slave may only return an FHS packet with the extended inquiry response bit set to zero.

A contention problem could arise when several devices are in close proximity to the inquiring device or master and all respond to an inquiry message at the same time. However, because every device has a free running clock it is highly unlikely that they all use the same phase of the inquiry hopping sequence. In order to avoid repeated collisions between devices that wake up in the same inquiry hop channel simultaneously, a device will back-off for a random period of time. Thus, if the device receives an inquiry message and returns an FHS packet, it will generate a random number, RAND, between 0 and MAX_RAND. For scanning intervals greater than or equal to 1.28 seconds MAX_RAND will be 1023, however, for scanning intervals less than 1.28 s MAX_RAND may be as small as 127. A profile that uses a DIAC may choose to use a smaller MAX_RAND than 1023 even when the scanning interval is greater than or equal to 1.28 s. The slave will return to the CONNECTION or STANDBY state for the duration of at least RAND time slots. Before returning to the CONNECTION and STANDBY state, the device may go through the page scan substate. After at least RAND slots, the device will add an offset of 1 to the phase in the inquiry hop sequence (the phase has a 1.28 second resolution) and return to the inquiry scan substate again. If the slave is triggered again, it will repeat the procedure using a new RAND. The offset to the clock accumulates each time an FHS packet is returned. During a period when the inquiry device is broadcasting inquiry packets, a slave may respond multiple times, but on different frequencies and at different times. Reserved synchronous slots should have priority over response packets; that is, if a response packet overlaps with a reserved synchronous slot, it will not be sent, but the next inquiry message is awaited. If a device has extended inquiry response data to send, but the extended inquiry response packet overlaps with a reserved synchronous slot, the FHS packet may be sent with the EIR bit set to zero.

The messaging during the inquiry routines is summarized as follows:

In step 1, the master transmits an inquiry message using the inquiry access code and its own clock.

In step 2, the slave responds with the FHS packet containing the slave's Bluetooth™ device address, native clock and other slave information. This FHS packet is returned at times that tend to be random. If the slave has non-zero extended inquiry response data to send it will return an FHS packet with the EIR bit set to one to the master 625 us after the inquiry message was received. It then returns an extended inquiry response packet 1250 us after the start of the FHS packet. FHS is always returned 625 us after inquiry message was received. But, consecutive FHS packets are returned according to this random process. The FHS packet is not acknowledged in the inquiry routine, but it is retransmitted at other times and frequencies as long as the master is probing with inquiry messages.

In step 3, if the slave has non-zero extended inquiry response data, it sends an extended inquiry response packet to the master.

3. Extended Inquiry Response

An Extended Inquiry Response may be used to provide miscellaneous information during the inquiry response procedure. Data types are defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information. If the slave transmits an extended inquiry response packet, it is transmitted 1250 microseconds after the start of the inquiry response packet. The extended inquiry response packet is received by the master at the hop frequency when the inquiry message received by the slave was first in the master-to-slave slot. The extended inquiry response packet is an Asynchronous Connection-oriented Logical transport (ACL) packet with type DM1, DM3, DM5, DH1, DH3 or DH5. To minimize interference it is recommended to use the shortest packet that is capable of containing the data. The packet is sent on the same frequency as the FHS packet, 1250 microseconds after the start of the FHS packet. In the packet header, LT_ADDR may be set to zero. TYPE may be one of DM1, DM3, DM5, DH1, DH3 or DH5. FLOW, ARQN and SEQN may all be set to zero and ignored during receipt. The HEC LFSR may be initialized with the same DCI (default check initialization) as for the FHS packet. In the payload header, LLID may contain the value 10 (start of an L2CAP message or no fragmentation). FLOW may be set to zero and ignored upon receipt. The length of the payload body (LENGTH) may be smaller than or equal to 240 bytes. The CRC LFSR may be initialized with the same DCI as for the FHS packet. The data whitening LFSR may be initialized with the same value as for the FHS packet. The length of the payload body (LENGTH) may be smaller than or equal to 240 bytes. The CRC LFSR may be initialized with the same DCI as for the FHS packet. The data whitening LFSR may be initialized with the same value as for the FHS packet. The payload data has two parts, a significant part followed by a non-significant part. The significant part contains a sequence of data structures. The non-significant part contains all zero octets. The baseband may not change any octets in the significant part. When transmitting data, the non-significant part octets may be omitted from the payload. A device may store a single extended inquiry response packet. This packet may be used with all IACs.

4. Page

Page is the initial phase of the connection procedure where a device transmits a train of page messages until a response is received from the target device or a timeout occurs. Page scan is a procedure where a device listens for page messages received on its page scan physical channel. In forming a connection, the paging device will become the master and the page scan device will become the slave in a piconet. Initially, after the slave has received an inquiry message, an inquiry response packet is transmitted from the slave to the master. The inquiry response packet sent from the slave contains information necessary for the inquiring master to page the slave, such as Bluetooth™ device address and the clock of the slave device. In the paging procedure, one the Bluetooth™ device that will become the master carries out a page procedure by transmitting page messages in connection request packets to the specified Bluetooth™ slave device that carries out a page scanning procedure to listen for connection request packets from the paging device. A connectable Bluetooth™ device listens for a page request on its page scan channel and, once received, enters into a sequence of exchanges with the paging device. In order for a device to connect to another device, it performs frequency hopping all page scan channel frequencies, sending a page request on each frequency and listening for a response. The page scan channel uses an access code derived from the scanning device's Bluetooth™ device address BD_ADDR to identify communications on the channel. The page scan channel uses a slower hopping rate than the hop rate of the paging device, using the Bluetooth™ device clock of the scanning device as an input. A device listening on its page scan channel remains passive until it receives a page request from another Bluetooth™ device, identified by the page scan channel access code. The two devices will then follow the page procedure to form a connection where the paging device is the master and the page scan device is the slave in a piconet. In order for a paging device to connect to another Bluetooth™ device, it uses the page scan channel of the target device in order to send page requests. If the paging device does not know the phase of the target device's page scan channel, it does not know the current hop frequency of the target device. Therefore, the paging device transmits page requests on each of the page scan hop frequencies and listens for a page response. This is done at a faster hop rate, allowing the paging device to cover all page scan frequencies in a short period of time. The paging device may have some knowledge of the target device's Bluetooth™ clock, such as indicated during a previous inquiry transaction between the two devices, and may be able to predict the phase of the target device's page scan channel. It may use this information to optimize the synchronization of the paging and page scanning process and speed up the formation of the connection.

5. Bluetooth™ RSSI

The received signal strength indicator (RSSI) is a measurement of the power present in a received radio signal. Bluetooth receiver circuits include an RSSI detector circuit to measure the strength of an incoming signal and generate an output representing the signal strength. For example, the received RF signal may be amplified and downconverted to an intermediate frequency (IF); then channel selection is performed on the IF signal, and the power of the IF signal in the selected channel is measured as the receiver signal strength indicator (RSSI) value. with a required accuracy +/−6 dBm.

RSSI Monitoring of Inquiry Response and Extended Inquiry Response Packets

During Bluetooth discovery, before a connection is created, the RSSI is measured from Inquiry Response (FHS) packets when it is received by an inquiring device.

When the controller receives an Inquiry Response (FHS), an HCI Inquiry Result with RSSI event is sent by the controller to the host application, which indicates that a remote Bluetooth device has responded during the current Inquiry process. This event will be sent from the Controller to the Host as soon as an Inquiry Response from a remote device is received. The RSSI parameter is measured during the FHS packet returned by each responding slave.

When the controller receives an Extended Inquiry Response, an HCI Extended Inquiry Result event is sent by the controller to the host application, which indicates that a remote Bluetooth device has responded during the current inquiry process with extended inquiry response data. This event will be sent from the Controller to the Host upon reception of an Extended Inquiry Response from a remote device. One single Extended Inquiry Response is returned per event. This event contains RSSI and inquiry response data for the remote device that responded to the latest inquiry. The RSSI parameter is measured during the Extended Inquiry Response packet returned by each responding slave.

RSSI Monitoring of Data Packets Received Over a Connection

After the discovery phase is completed, once a Bluetooth device is connected to another Bluetooth device, the received signal strength indication (RSSI) may be used by a receiving device to monitor the received power level of the data communication packets received over the connection. The RSSI value is calculated from received packet in the Bluetooth physical layer, and may be read by the host application through the host controller interface (HCI) Read RSSI command, for example once per second.

The Read RSSI Command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

Measuring Pathloss with the RSSI and the TX Power Level

The TX Power Level data field in the Extended Inquiry Response packet indicates the transmitted power level of the EIR packet at the transmitter of the sending device. The TX Power Level data field may be used to calculate path loss of a received packet when the receiving device measures the RSSI of the received packet, using the following equation:

pathloss=Tx Power Level−RSSI of the inquiry response packet

For example, if Tx Power Level=+4 (dBm) and the RSSI on the inquiry response packet is −60 (dBm) then the total pathloss is +4−(−60)=+64 dB. If a second inquiry response packet were received at −40 dBm with a Tx Power Level data=+15 dBm the resulting pathloss would be +55 dB. An application may use these pathloss values to choose which device it thinks might be closer (the one with the lower pathloss value).

Unfortunately, due to fading and varying antenna, circuit, and chip characteristics, these resulting pathloss values may have some uncertainty. Some of the uncertainty (for example, due to fading) may be able to be removed if multiple inquiry response packets are received from the same device.

6. Bluetooth™ Host Controller Interface

The Bluetooth™ radio in a device includes the host controller interface that provides a command interface between the host application in the device and the link layer of the Bluetooth™ radio, also referred to as the controller, to enable access to hardware status and control registers of the Bluetooth™ radio.

The host controller interface (HCI) is described in the Bluetooth™ Core Specification. The Host will receive asynchronous notifications of HCI events from Host Controller Transport Layer. HCI events are used for notifying the Host when something occurs. When the Host discovers that an event has occurred it will then parse the received event packet to determine which event occurred. The commands and events are sent between the Host and the Controller. These are grouped into logical groups by function.

The HCI provides a command interface between the host application in a device and the Bluetooth™ link layer, provides access to hardware status and control registers of the Bluetooth™ radio, and provides a uniform method of accessing the Bluetooth™ baseband capabilities.

Discovery Phase HCI Commands and Events

The device discovery group of commands and events allow a device to discover other devices in the surrounding area. The host controller interface includes the standard HCI Inquiry Result Event logic and HCI Extended Inquiry Result Event_ logic that recognizes the receipt of the FHS packet and the EIR packet, respectively. Some of the HCI commands and events for device discovery are described as follows:

Inquiry Command

The HCI Inquiry command will cause the Bluetooth Controller to enter Inquiry Mode to transmit inquiry packets used to discover other nearby Bluetooth devices.

Inquiry Result Event

HCI Inquiry Result Event:

The inquiry result event indicates that a remote device has responded with an inquiry response (IR), i.e. with an FHS packet, during the current inquiry process. This event will be sent from the Bluetooth™ Controller to the Host as soon as an Inquiry Response from a remote device is received. The event parameters in the HCI inquiry result event include BD_ADDR and Class_of_Device of the remote responding device and Clock_Offset OFFSET(A,B) between the responding device and the inquiring device.

Inquiry Result with RSSI Event,

The Inquiry Result with RSSI event indicates that a remote Bluetooth device has responded with an inquiry response (FHS) packet during the current Inquiry process. The event reported to the host includes the BD_ADDR address for the device that responded, the Class of Device for the device, the clock offset between the responding device and the receiving device, and the measured RSSI of the received inquiry response packet in units of dB. This is similar to the inquiry result event, but it includes the RSSI value calculated by the controller Extended Inquiry Result Event HCI Extended Inquiry Result Event:

The extended inquiry result event indicates that another Bluetooth™ device has responded during the current inquiry process with extended inquiry response data. Data received in this event will be sent from the device's Controller to the Host upon reception of an EIR from a remote device. One single extended inquiry response is returned per event. The event reported to the host includes the received signal strength indication (RSSI) measurement and inquiry response data for the device that responded to the latest inquiry. The RSSI parameter is measured during the FHS packet returned by each responding device. If an extended inquiry response packet from the same remote device is correctly received in a later response, another event is generated. The Extended_Inquiry_Response data fields are not interpreted by the controller. The standard HCI Extended Inquiry Result Event logic performs the HCI extended inquiry result event procedure to extract the data from the received extended inquiry response packet and to send this data to the host application. The received EIR data extracted from the packet may be passed unaltered to the host application.

Read Inquiry Response Transmit Power Level Command

This command will read the inquiry response Transmit Power level data of the remote device, expressed in a field of the EIR packet, indicating the power that was used to transmit the FHS and EIR data packets during the discovery phase.

HCI Write Extended Inquiry Response Command

At the remote responding device, the Write_Extended_Inquiry_Response command writes the extended inquiry response to be sent to an inquiring device during the extended inquiry response procedure. The write extended inquiry response command will write the data that the device's host wishes to send in the extended inquiry response packet during inquiry response. The FEC_Required command parameter states if forward error correction (FEC) encoding is required. The initial value of the inquiry response data is all zero octets. The controller does not interpret the extended inquiry response data, but passes it on to the baseband medium access control and physical radio for transmission in an EIR packet.

Write Inquiry Transmit Power Level Command

At the remote responding device, the Write Inquiry Transmit Power Level Command is used by the transmitting device to write the transmit power level used to transmit the inquiry data packets.

Connection Phase HCI Commands and Events

Read RSSI Command

After the discovery phase is completed, once a Bluetooth device is connected to another Bluetooth device, the received signal strength indication (RSSI) may be used by a receiving device to monitor the received power level of the data communication packets received over the connection. The RSSI value is calculated by the Bluetooth physical layer, and may be read by the host application through the host controller interface (HCI) Read RSSI command.

The Read RSSI Command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

The RSSI parameter in the Read RSSI command is a signed 8-bit value, and is interpreted as an indication of arriving signal strength at the antenna measured in dBm. This command reads the Received Signal Strength Indication (RSSI) value from the Controller. For a Basic Rate/Enhanced Data Rate (BR/EDR) Controller, a Connection_Handle is used as the Handle command parameter and return parameter. The RSSI parameter returns the difference between the measured Received Signal Strength Indication (RSSI) and the limits of the Golden Receive Power Range for a Connection_Handle to another BR/EDR Controller. The Connection_Handle must be a Connection_Handle for an ACL connection. Any positive RSSI value returned by the Controller indicates how many dB the RSSI is above the upper limit, any negative value indicates how many dB the RSSI is below the lower limit. The value zero indicates that the RSSI is inside the 20 dB-wide Golden Receive Power Range. The accuracy of the dB values will depend on the Bluetooth hardware. The only requirements for the hardware are that the BR/EDR Controller is able to tell whether the RSSI is inside, above or below the Golden Device Power Range. The RSSI measurement compares the received signal power with two threshold levels, which define the Golden Receive Power Range. The lower threshold level corresponds to a received power between −56 dBm and 6 dB above the actual sensitivity of the receiver. The upper threshold level is 20 dB above the lower threshold level to an accuracy of +/−6 dB. The meaning of the RSSI metric is an absolute receiver signal strength value in dBm to ±6 dBm accuracy. If the RSSI cannot be read, the RSSI metric is set to 127. (When the Read_RSSI command has completed, a Command Complete event is generated.)

Read Transmit Power Level Command

The Read Transmit Power Level command will read the values for the Transmit Power Level parameter for the specified Connection_Handle for data communication packets during the connection phase, in a range of −30 to +20 dBm.

C. Touch to Select in Bluetooth Technology

The Bluetooth Touch to Select feature employs Received Signal Strength Indication (RSSI) information calculated from the FHS packet, which is used in determining that an inquiry scanning device is within "touch range", i.e. proximate or in close proximity of the inquiring device, and when a threshold for that close proximity is met. This provides an "intent to share" or "touch to connect" feature.

The inquiring device may measure the signal strength (e.g., RSSI) of each response message from a inquiry scanning device, which may be used in ordering the responding devices. In this manner, the inquiry scanning device with the highest measured signal strength is listed first (e.g., wherein the measured signal strength may correlate to the distance between the inquiring device and the responding inquiry scanning device).

An inquiry scanning device receiving inquiry packets from an inquiring device may respond by transmitting an inquiry response FHS packet or an FHS packet followed by an EIR packet. The host in the inquiring device may recognize EIR events triggered by the responses. The reported EIR events may include RSSI measurement values made by the inquiring device on the received FHS packets. From the RSSI values, the host in the inquiring device may detect when an inquiry scanning device is most likely within "touching range", that is within a distance from the inquiring device that indicates touching-related operations may be executed.

It may also be possible to determine when an inquiry scanning device is moving closer to an inquiring device. The Bluetooth controller in the inquiring device may report the receipt of FHS and/or EIR inquiry responses to its host software stack as an HCI Inquiry Event that may contain the measurement of the RSSI performed on the received response. In instances where EIR responses are received, the Bluetooth controller in the inquiring device may report each received EIR as an HCI EIR Event. When a inquiry scanning device moves closer to an inquiring device, the Bluetooth controller in the inquiring device may report an RSSI for each EIR response, thereby enabling the inquiring device to track the changing RSSI levels of the scanning device and thus its relative movement. When the measured RSSI satisfies predetermined response criteria (e.g., including the RSSI being measured to be at or above a predetermined level), the corresponding scanning device may be selected for touch-related operations (e.g., expedited connection establishment).

The Bluetooth controller in an inquiring device reports the receipt of inquiry responses to its host, which also has Touch selection software running. Typical response criteria may include RSSI values measured on the responses, being sensed above certain fixed threshold value, such as −30 dBm. Sensing a response packet having an RSSI of −30 dBm will then cause the Touch selection software in the inquiring device to trigger device selection, while an RSSI of −31 dBm will not. It may also be possible that responding inquiry scanning devices may send Tx power information in EIR packet, since this is an existing feature in the Bluetooth specification v4.0. In instances where Tx power information about the inquiry scanning device is available in the EIR packet, the predetermined response criteria may include an adjustable RSSI threshold value that accounts for variations in the Tx power. For example, the threshold value may be set at 30 dBm below the EIR Tx power, so that if the Tx power level in an FHS packet is +20 dBm then the threshold value that will trigger selection may be the FHS packet being measured at −10 dBm, or dBm below of Tx power level. Secondly, to ensure that devices are maintained in close proximity, the predetermined response criteria may require that more than one EIR must have a sensed RSSI at or above a threshold value. In addition different thresholds may be used for different phases, for example, first the threshold value may be set above −45 dBm to select one or more candidate devices and then a second, more decisive threshold value may be set above −30 dBm.

The detected RSSI may also be a function of: [1] antenna location of the inquiry scanning device sending the signal and [2] antenna location of the inquiring device sensing the signal. The results may be improved if the antennas were brought into close proximity, which may require moving away from obstructions and changing the orientation of one or both devices.

D. Connection Formation Between IEEE 802.11 WLAN Devices

An example wireless network, such as a Wireless Local Area Network (WLAN) may be organized as an independent basic service set (IBSS), mesh basic service set (MBSS) or an infrastructure basic service set (BSS). Wireless devices in an independent basic service set (IBSS) communicate directly with one another and there is no access point (AP) in the IBSS. A mesh basic service set (MBSS) consists of autonomous wireless devices that establish peer-to-peer wireless links that provide means for multi-hop communication. An infrastructure basic service set (BSS) includes a wireless access point that may be connected to one or more servers and peripheral devices by a wired backbone connection. In an infrastructure BSS, the access point is a central hub to which mobile wireless devices are wirelessly connected. The mobile wireless devices typically do not communicate directly with one another, but communicate indirectly through the access point. An access point may be connected to other access points by a wired backbone connection in an extended service set (ESS). Mobile wireless devices may roam from one wireless connection with one access point to a second wireless connection with a second access point in the ESS, and still be linked to the first access point in the ESS via the wired backbone connection.

The IEEE 802.11 standard specifies methods and techniques of wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j, k, n, r, s, u, v, and z protocols, into the base standard *IEEE 802.11-2012, Wireless Medium Access Control (MAC) and Physical Layer (PHY) Specifications*, February 2012 (incorporated herein by reference). Since then, emerging broadband applications have stimulated interest in developing very high-speed wireless networks for short range communication, for example, the IEEE 802.11n, the planned IEEE 802.11ac, and the planned IEEE 802.11ad WLAN specifications that are to provide a very high throughput in higher frequency bands. Applications of these IEEE 802.11 standards include products such as consumer electronics, telephones, personal computers, and access points for both for home and office.

According to an example embodiment, wireless local area networks (WLANs) typically operate in unlicensed bands. IEEE 802.11b and 802.11g WLANs have been a staple technology for traditional WLAN applications in the 2.4 GHz ISM band and have a nominal range of 100 meters. The IEEE 802.11 ah WLAN standard is being developed for operation in the 900 MHz ISM band and will have a greater range and lower obstruction losses due to its longer wavelength.

1. IEEE 802.11 MAC Frames and Information Elements

There are three major types of medium access control (MAC) frames in the IEEE 802.11 protocol: the management frame, the control frame, and the data frame. Management frames provide management services. Data frames carry payload data. Control frames assist in the delivery of data frames. Each of these types of MAC frame consists of a MAC header, a frame body, and a frame check sequence (FCS). The header contains control information used for defining the type of 802.11 MAC frame and providing information necessary to process the MAC frame. The frame body contains the data or information included in either management type or data type frames. The frame check sequence is a value representing a cyclic redundancy check (CRC) over all the fields of the MAC header and the frame body field.

Management frames are used to provide management services that may be specified by variable-length fields called information elements included in the MAC frame body. An information element includes three fields: its function is identified by an element ID field, its size is provided by a length field, and the information to deliver to the recipient is provided in a variable-length information field.

2. IEEE 802.11 Beacon, Probe Request and Response a. Beacon

The beacon frame is a management frame that is transmitted periodically to allow wireless devices to locate and identify a network. The beacon frame includes the fields: timestamp, beacon interval, and capability information. The timestamp contains the value of the device's synchronization timer at the time that the frame was transmitted. The capability information field is a 16-bit field that identifies the capabilities of the device. The information elements in a beacon frame are the service set identifier (SSID), the supported rates, one or more physical parameter sets, an optional contention-free parameter set, and an optional traffic indication map.

i. Infrastructure BSS Networks with an Access Point

In an infrastructure BSS networks with an Access Point, beacon frames are used for enabling wireless devices to establish and maintain orderly communications. The beacon frames are transmitted by the Access Points at regular intervals and include a frame header and a body with various information, including a SSID identifying the name of a specific WLAN and a beacon interval specifying the intended time interval between two beacon transmissions. One purpose of the beacon frames is to inform the wireless devices about the presence of an Access Point in the area. The access point in an infrastructure BSS IEEE 802.11 WLAN network, may be a central hub that relays all communication between the mobile wireless devices (STAs) in an infrastructure BSS. If a STA in an infrastructure BSS wishes to communicate a frame of data to a second STA, the communication may take two hops. First, the originating STA may transfer the frame to the AP. Second, the AP may transfer the frame to the second STA. In an infrastructure BSS, the AP may transmit beacons or respond to probes received from STAs. After a possible authentication of a STA that may be conducted by the AP, an association may occur between the AP and a STA enabling data traffic to be exchanged with the AP. The Access Point in an Infrastructure BSS may bridge traffic out of the BSS onto a distribution network. STAs that are members of the BSS may exchange packets with the AP.

ii. Ad Hoc IBSS Networks

The first ad hoc wireless device to become active establishes an IBSS and starts sending beacons to inform the other wireless devices about the presence of an ad hoc network in the area. Other ad hoc wireless devices may join the network after receiving a beacon and accepting the IBSS parameters, such as the beacon interval, found in the beacon frame.

Each wireless device that joins the ad hoc network may send a beacon periodically if it doesn't hear a beacon from another device within a short random delay period after the beacon is supposed to be sent. If a wireless device doesn't hear a beacon within the random delay period, then the wireless device assumes that no other wireless devices are active in the ad hoc network and a beacon needs to be sent.

A beacon signal is periodically transmitted from the ad hoc network. The beacon frame is transmitted periodically and includes the address of the sending device.

b. Probe Request

The probe request frame is a management frame that is transmitted by a wireless device attempting to quickly locate a wireless local area network (LAN). It may be used to locate independent basic service sets (IBSSs), infrastructure basic service sets (BSSs) or mesh basic service sets (MBSSs) only or any of them. It may be used to locate a wireless LAN with a particular SSID or to locate any wireless LAN. The probe request frame may contain a service attribute request.

For active scans, the wireless device either broadcasts or unicasts a probe request on the channel it is scanning. It may set the SSID in the probe request to a wildcard SSID or to a specific SSID value. It may set the BSSID in the probe request a wildcard BSSID or to a specific BSSID value. With these options the wireless device can look for any SSID or BSSID, any representative of a specific SSID or a specific BSSID. The wireless device will add any received beacons or probe responses to a cached BSSID scan list. For passive scans, the wireless device does not send a probe request, but instead, listens on a channel for a period of time and adds any received beacons or probe responses to its cached BSSID scan list. The wireless device may scan both infrastructure and ad hoc networks, regardless of the current setting of its network mode. The wireless device may use either the active or passive scanning methods, or a combination of both scanning methods. The wireless device performs the scan across all the frequency channels and bands that it supports.

i. Infrastructure BSS Networks with an Access Point

The wireless device may transmit a probe request and receive a probe response from the access point in the BSS. The probe request is transmitted by a wireless device to obtain information from another station or access point. For example, a wireless device may transmit a probe request to determine whether a certain access point is available. In the infrastructure BSS, only the AP responds to probe requests. The probe response sent back by the AP contains a timestamp, beacon interval, and capability information. It also includes the SSID of the BSS, supported rates, and PHY parameters. The wireless device STA may learn that the access point AP will accept the STA's credentials.

Exemplary rules applied by the scanning wireless device (i.e. scanner) and the APs with active scanning are as follows:

1) Scanner (for each channel to be scanned):
   a. ProbeTimer is set before transmission of probe request. During the probe timer the scanning device tries to obtain a transmission from the media in order to obtain NAV information. If transmission is received or the probe timer expires, the device may transmit a probe request.
   b. Transmit a probe request frame (or multiple of thereof) with the SSID and the BSSID fields set as per the scan command;
   c. Reset ProbeTimer to zero and start it upon the probe request transmission;
   d. If nothing is detected (any signal with high enough energy) on the channel before the ProbeTimer reaches MinChannelTime (a.k.a. Min_Probe_Response_Time), then go to scan the next channel (if any), else when the ProbeTimer reaches MaxChannelTime (i.e., Max_Probe_Response_Time), process all received probe responses and go to scan the next channel (if any).

2) APs:
   a. An AP shall respond with a probe response only if:
      i. The Address 1 field in the probe request frame is the broadcast address or the specific MAC address of the AP; and
      ii. The SSID in the probe request is the wildcard SSID, the SSID in the probe request is the specific SSID of the AP, or the specific SSID of the AP is included in the SSID list element of the probe request, or the Address 3 field in the probe request is the wildcard BSSID or the BSSID of the AP.
   b. Some further conditions may be set as well for the generation of a probe response.

In general, the probe request transmitter specifies the conditions that wireless devices need to meet in order to respond to with a probe response. All wireless devices that fulfill the condition try to send a probe response frame. The active scanning mechanism defines the signaling.

ii. Ad Hoc IBSS Networks

The effect of receiving a probe request is to cause the wireless device to respond with a probe response if the conditions indicated in the probe request are met. When a wireless device arrives within the communication range of any member of an ad hoc network, its probe request frame inquiry signals are answered by a member of the ad hoc network detecting the inquiry. A device in an ad hoc network that broadcasted the latest beacon in the network responds to the probe request frame inquiry signals with a probe response containing the address of the responding device. The probe response frame also includes the timestamp, beacon interval, capability information, information elements of the SSID, supported rates, one or more physical parameter sets, the optional contention-free parameter set, and the optional ad hoc network parameter set.

Once a device has performed an inquiry that results in one or more ad hoc network descriptions, the device may choose to join one of the ad hoc networks. The joining process may be a purely local process that occurs entirely internal to the wireless device. There may be no indication to the outside world that a device has joined a particular ad hoc network. Joining an ad hoc network may require that all of the wireless device's MAC and physical parameters be synchronized or compatible with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the wireless device has joined the ad hoc network and is ready to begin communicating with the devices in the ad hoc network.

c. Probe Response

The probe response sent back by a wireless device that met the conditions set by the received probe request may contain a timestamp, beacon interval, and capability information. It may also include the SSID of the BSS, supported rates, and PHY parameters.

According to an example embodiment, standard spacing intervals are defined in the IEEE 802.11 specification, which delay a station's access to the medium, between the end of the last symbol of the previous frame and the beginning of the first symbol of the next frame. The short interframe space (SIFS), may allow acknowledgement (ACK) frames and clear to send (CTS) frames to have access to the medium before others. The longer duration distributed coordination function (DCF) interframe space (IFS) or DCF Interframe Space (DIFS) interval may be used for transmitting data frames and management frames.

According to an example embodiment, after the channel has been released, IEEE 802.11 and before a probe response is transmitted, wireless devices may normally employ a spectrum sensing capability during the SIFS interval or DIFS interval, to detect whether the channel is busy. A carrier sensing scheme may be used wherein a node wishing to transmit a probe response has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission of a probe response for a random period of time called the backoff interval. In the DCF protocol used in IEEE 802.11 networks, the stations, on sensing a channel idle for DIFS interval, may enter the backoff phase with a random value between 0 and a maximum value CW. (CW is adjusted between $CW_{Min}$ and $CW_{Max}$ based on transmission failures/successes.) The backoff counter may be decremented from this selected value as long as the channel is sensed idle for a predetermined time interval. After every received frame one may however wait for a DIFS before sensing the channel status and resuming backoff counter update.

3. Generic Advertisement Service (GAS)

IEEE 802.11u-2011 is an amendment to the IEEE 802.11-2007 base standard published as *IEEE 802.11u-2011, Wireless LAN Medium Access Control (MAC) and Physical Layer (PHY) Specifications, Amendment 9: Interworking with External Networks*, Feb. 25, 2011 (incorporated herein by reference). IEEE 802.11u-2011 adds features to improve interworking with external networks. IEEE 802.11u-2011 amendment establishes MAC and physical layer PHY protocols for an interworking service to permit a wireless device to exchange information with an external network, to enable the selection of networks to connect to, and to enable access to emergency services. A GAS is specified in the IEEE 802.11u amendment to enable mobile wireless devices or STAs to discover the availability of information related to desired network services. For example, the GAS enables discovery of information about services provided in an infrastructure basic service set, information about local access services, information from available Subscription Service Providers (SSP) and/or Subscription Service Provider Networks (SSPNs) or other external networks. GAS enables a wireless device to transmit a generic advertisement service initial request frame to request information about network services from access points and it enables an access point to use a generic container, a GAS initial response frame, to advertise information about network services over an IEEE 802.11 network. The GAS protocol has been proposed to be updated to operate with broadcast request and response messages. Public action frames are used to transport the GAS initial request frame and the GAS initial response frame.

4. Wi-Fi Direct

The Wi-Fi Alliance has developed a Wi-Fi Peer-to-Peer technology named Wi-Fi Direct™ that is specified in the *Wi-Fi Alliance Peer-to-Peer Specification*, October 2010 (incorporated herein by reference). Wi-Fi Direct is also referred to herein as Peer-to-Peer (P2P) or Device-to-Device (D2D). Wi-Fi Direct enables IEEE 802.11a, g, or n devices to connect to one another, peer-to-peer, without prior setup or the need for wireless access points. Devices that support Wi-Fi Direct may discover one another and advertise available services. Wi-Fi Direct devices support typical Wi-Fi ranges and the same data rates as can be achieved with an 802.11a, g, or n infrastructure connection. When a device enters the range of the Wi-Fi Direct device, it may connect to it using the specified protocol.

Wi-Fi Direct enables wireless devices that support Wi-Fi Direct, to connect to one another, point-to-point, without joining an infrastructure network. Wireless devices that support the specification will be able to discover one another and advertise available services. Wi-Fi Direct devices will support typical Wi-Fi ranges and the same data rates as can be achieved with an infrastructure connection. Wi-Fi Direct provides point-to-point connections for networks by embedding a software access point into any Wi-Fi Direct devices.

Wi-Fi Direct-certified devices may create direct connections between each other without requiring the presence of a traditional Wi-Fi infrastructure network of an access point or router. Wi-Fi Direct Device Discovery and Service Discovery features allow users to identify available devices and services before establishing a connection, for example, discovering which Wi-Fi Direct devices have a printer. Wi-Fi Direct devices may use Wi-Fi Protected Setup to create connections between devices.

A Wi-Fi Direct device is capable of a peer-to-peer connection and may support either an infrastructure network of an access point or router or a peer-to-peer connection. Wi-Fi Direct devices may join infrastructure networks as stations (STAs). Wi-Fi Direct devices may connect by forming groups in a one-to-one or one-to-many topology. The group functions in a manner similar to an infrastructure basic service set. A single Wi-Fi Direct device will be the group owner that manages the group, including controlling which devices are allowed to join and when the group is started or terminated. The group owner is responsible for responding to probe requests in a similar manner as an AP of an infrastructure BSS. The group owner will appear as an access point to legacy client devices. A significant difference between a group owner and an access point is that it is optional for the group owner to route and forward traffic between clients associated to it.

Wi-Fi Direct devices include Wi-Fi Protected Setup Internal Registrar functionality. A Wi-Fi Direct device may be a group owner of a group and may be able to negotiate which device adopts this role when forming a group with another Wi-Fi Direct device. A group may include both Wi-Fi Direct devices and legacy devices (i.e., that are not compliant with the Wi-Fi Alliance Peer-to-Peer Specification). Legacy devices may only function as clients within a group.

Wi-Fi Direct devices may support discovery mechanisms. Device discovery is used to identify other Wi-Fi Direct devices and establish a connection by using a scan similar to that used to discover infrastructure access points. If the target is not already part of a group, a new group may be formed. If the target is already part of a group, the searching Wi-Fi Direct device may attempt to join the existing group. Wi-Fi Protected Setup may be used to obtain credentials from the group owner and authenticate the searching Wi-Fi Direct device. Wi-Fi Direct devices may include service discovery that enables the advertisement of services supported by higher layer applications to other Wi-Fi Direct devices. Service discovery may be performed at any time (e.g. even before a connection is formed) with any other discovered Wi-Fi Direct device.

A Group may be created by a single Wi-Fi Direct device. When forming a connection between two Wi-Fi Direct devices, a group may be formed automatically and the devices may negotiate to determine which device is the group owner. The group owner may decide if this is a temporary (single instance) or persistent (multiple, recurring use) group. After a group is formed, a Wi-Fi Direct device may invite another Wi-Fi Direct device to join the group. The decision of whether or not to accept an invitation may be left to the invited Wi-Fi Direct device.

5. Measurement of RSSI for IEEE 802.11 WLAN Packets

The IEEE 802.11 physical layer deliver the received signal strength indicator (RSSI) parameter to higher layers. The RSSI value is used by the internal circuitry of the chipset to determine, for example, if the channel is busy or not during carrier sensing. The RSSI value is an integer with an allowable range of 0-255. The RSSI value is measured in the preamble of the receiving packet and not continuously during the whole packet transmission. As soon as a preamble is detected, the receiver signals to the MAC layer that there is activity on the wireless channel and it also states the RSSI value that has been detected. The RSSI value may be related to the SNR, i.e., the integer value of RSSI may represent the number of dB above the noise floor.

E. Wireless Short-Range Communication Disconnection

The Bluetooth Touch to Select feature in an inquiring device, is based on the Received Signal Strength Indication (RSSI) value calculated from an inquiry response FHS packet and an extended inquiry response (EIR) packet received during the discovery phase from an inquiry scanning device. If the host application in the inquiring device determines that the RSSI value is greater than a threshold value during the discovery phase, then the inquiry scanning device is considered in close proximity to or within "touch range" of the inquiring device and may be selected by the host application.

In accordance with an example embodiment of the invention, the inquiring device is referred to as the first device and the inquiry scanning device is referred to as the second device. In the connection phase after the discovery phase has been completed and the wireless communication has been established, the first device exchanges wireless communication messages, such as data, music, video, and the like, over the wireless communication connection with the second wireless device. After a delay interval following establishment of the connection, the first device may measure the power level of the received communication messages from the second device during the connection phase. If the wireless communication messages received over the wireless communication connection, have a measured power level greater than a second threshold value, then the first device may invoke an operation, such as disconnecting the wireless communication connection with the second wireless device, in accordance with at least one embodiment of the invention.

FIG. 1A is an illustration of an example embodiment of a network in a device discovery phase 200, with a first device 102 broadcasting one or more wireless device discovery messages 150 to one or more wireless devices, including a second wireless device 100, in accordance with at least one embodiment of the present invention. The following is one example embodiment applied to Bluetooth technology.

FIG. 1A is an illustration of an example embodiment of the invention, of an example network with a first Bluetooth™ inquiring device 102 broadcasting one or more inquiry packets 150 to one or more inquiry scanning devices, including a second Bluetooth™ inquiry scanning device 100, in accordance with at least one embodiment of the present invention. In embodiments of the invention, the inquiry scanning device 100 and the inquiring device 102 include a processor 122, which includes from one to many central processing units (CPUs) 124 and 125, a random access memory (RAM) 126, a read only memory (ROM) 127, and interface circuits 128 to interface with one or more radio transceivers 116, battery or house power sources, keyboard, display 144, etc. The RAM and ROM can be removable memory devices such as smart cards, SIMs, WIMs, semiconductor memories such as RAM, ROM, PROMS, flash memory devices, etc.

The Bluetooth™ inquiry scanning device 100 and the inquiring device 102 include the host controller interface (HCI) 111 that provides a command interface between the host application 110 in the device and the link layer or MAC 114 and the radio 116, also referred to as the controller, to enable access to hardware status and control registers of the Bluetooth™ radio 116. The host controller interface (HCI) is described in the Bluetooth™ Core Specification. The Host application 110 will receive asynchronous notifications of HCI events from HCI 111. HCI events are used for notifying the Host application 110 when something occurs. When the Host application discovers that an event has occurred, it will then parse the received event packet to determine which event occurred. The commands and events are sent between the Host application 110 and the radio 116. The HCI 111 provides a command interface between the host application 110 in a device and the Bluetooth™ link layer or MAC 114, provides access to hardware status and control registers of the radio 116, and provides a uniform method of accessing the Bluetooth™ baseband capabilities.

The processor 122 in the inquiring device 102 outputs data to the Bluetooth™ MAC 114 that packages the data into Bluetooth™ protocol data units (PDU) or packets, such as inquiry packets 150, that are input to the Bluetooth™ PHY radio 116 for normal Bluetooth™ transmission. During normal Bluetooth™ transmission, the RF signal from the radio 116 is directed to the antenna B 170 for transmission.

Inquiry scanning device 100 and inquiring device 102 may be, for example, a miniature device such as a key fob, smart card, jewelry, or the like. Inquiry scanning device 100 and inquiring device 102 may be, for example, a relatively larger cell phone, smart phone, flip-phone, PDA, graphic pad, or even larger devices such as a laptop computer, desktop computer, kitchen appliance, such as a refrigerator, an automobile dashboard, and the like. In embodiments, the relative sizes of devices 100 and 102 may be arbitrary, either one of the devices may be either mobile or fixed-base.

FIG. 1B is an illustration of an example embodiment of the network of FIG. 1A, in the device discovery phase 200, wherein the first device 102 has received from the second wireless device 100 one or more wireless response messages 158 and 160, responding to the discovery messages 150. The first device 102 measures the power level of the wireless response messages 158 and 160. The first device 102 selects the second device 100, if the one or more wireless response messages 158 and/or 160 received from the second wireless device 100 has a measured power level greater than a first threshold value Th1. The first device 102 may then establish a wireless communication connection 176 (shown in FIG. 1C) with the second device 100, in accordance with at least one embodiment of the present invention. The following is one example embodiment applied to Bluetooth technology.

In an example embodiment of the invention, the second Bluetooth™ device, the inquiry scanning device 100, transmits one or more response messages including a response packet, such as an inquiry response FHS packet 158 and an inquiry response with an extended inquiry response (EIR) packet 160, in response to the inquiry packet 150, in accordance with at least one embodiment of the present invention.

In an example embodiment of the invention, an RSSI value may be measured by the inquiring device 102, for the inquiry response FHS packet 158 and for inquiry response including extended inquiry response (EIR) packet 160. The RSSI is measured for the FHS packet, whether or not the EIR packet is present. When there is an EIR packet, it is accompanied by a preceding FHS packet that is measured for its RSSI.

The received signal strength indicator (RSSI) is a measurement of the power present in the inquiry response FHS packet 158 and/or inquiry response including the extended inquiry response (EIR) packet 160 radio signal. Bluetooth receiver circuits 116 include an RSSI detector circuit 115 to measure the strength of an incoming signal and generate an output representing the signal strength. For example, the received RF signal may be amplified and downconverted to an intermediate frequency (IF); then channel selection is performed on the IF signal, and the power of the IF signal in the selected channel is measured as the receiver signal strength indicator (RSSI) value. with a required accuracy +/−6 dBm.

During Bluetooth discovery, before a connection is created, the RSSI is measured for Inquiry Response (FHS) packet when it is received by the inquiring device 102. When the radio 116 receives an Inquiry Response (FHS) packet 158, an HCI Inquiry Result with RSSI event is sent by the radio 116 to the host application 110, which indicates that a remote Bluetooth device 100 has responded during the current Inquiry process. This event will be sent from the radio 116 to the Host application 110 as soon as an Inquiry Response 158 from a remote device 100 is received. The RSSI parameter is measured during the receipt of the FHS packet 158.

When the radio 116 receives an Extended Inquiry Response 160, an HCI Extended Inquiry Result event is sent by the radio 116 to the host application 110, which indicates that a remote Bluetooth device 100 has responded during the current inquiry process with extended inquiry response data. This event will be sent from the radio 116 to the Host application 110 upon reception of an Extended Inquiry Response 160 from a remote device 100. One single Extended Inquiry Response 160 is returned per event. This event contains RSSI and inquiry response data for the remote device 100 that responded to the latest inquiry 150. The RSSI parameter is measured during the receipt of the FHS packet 160.

The inquiring device may use the RSSI of the response message 158 from a inquiry scanning device 100, in ordering the responding devices. In this manner, the inquiry scanning device with the highest measured signal strength may be listed first. For example, the measured signal strength may correlate with the distance between the inquiring device and the responding inquiry scanning device.

From the RSSI values, the host in the inquiring device may detect when an inquiry scanning device is most likely within "touching range", that is within a distance from the inquiring device that indicates touching-related operations may be executed.

It may also be possible to determine when an inquiry scanning device 100 is moving closer to an inquiring device 102. The Bluetooth radio 116 in the inquiring device may report the receipt of FHS and/or EIR inquiry responses to the host application as an HCI Inquiry Event that may contain the measurement of the RSSI performed on the received response 158. In instances where EIR responses 160 are received, the Bluetooth radio 116 in the inquiring device 102 may report each received EIR as an HCI EIR Event. When a inquiry scanning device 100 moves closer to an inquiring device 102, the Bluetooth radio 116 in the inquiring device 102 may report an RSSI for each EIR response 160, thereby enabling the inquiring device 102 to track the changing RSSI levels of the inquiry scanning device 100 and thus its relative movement. When the measured RSSI satisfies predetermined response criterion, such as a threshold value, the corresponding inquiry scanning device 100 may be selected for touch-related operations, such as expedited connection establishment.

The Bluetooth radio 116 in the inquiring device 102 reports the receipt of inquiry responses 158 to its host application 110, which also has Touch selection software running. Typical response criteria may include RSSI values measured on the response 158, being sensed above certain fixed threshold value, such as −30 dBm. Sensing a response packet having an RSSI of −30 dBm will then cause the Touch selection software in the host application of inquiring device 102 to trigger device selection, while an RSSI of −31 dBm will not. It may also be possible that responding inquiry scanning devices 100 may send Tx power information in EIR packet 160, since this is an existing feature in the Bluetooth specification v4.0. In instances where Tx power information about the inquiry scanning device 100 is available in the EIR packet 160, the predetermined response criteria may include an adjustable RSSI threshold value that accounts for variations in the Tx power of the inquiry scanning device 100. For example, the threshold value may be set at 30 dBm below the EIR Tx power, so that if the Tx power level of an FHS packet 158 is +20 dBm, then the threshold value that will trigger selection may be the FHS packet 158 being measured at −10 dBm, or 30 dBm below of Tx power level. Secondly, to ensure that devices 100 and 102 are maintained in close proximity, the predetermined response criteria may require that more than one EIR 160 have a sensed RSSI at or above a threshold value. In addition, different thresholds may be used for different phases, for example, first the threshold value may be set above −45 dBm to select one or more candidate devices 100 and then a second, more decisive threshold value may be set above −30 dBm.

The detected RSSI may also be a function of: [1] antenna location of the inquiry scanning device 100 sending the signal and [2] antenna location of the inquiring device 102 sensing the signal. The results may be improved if the antennas were brought into close proximity, which may require moving away from obstructions and changing the orientation of one or both devices.

Figure 1C:
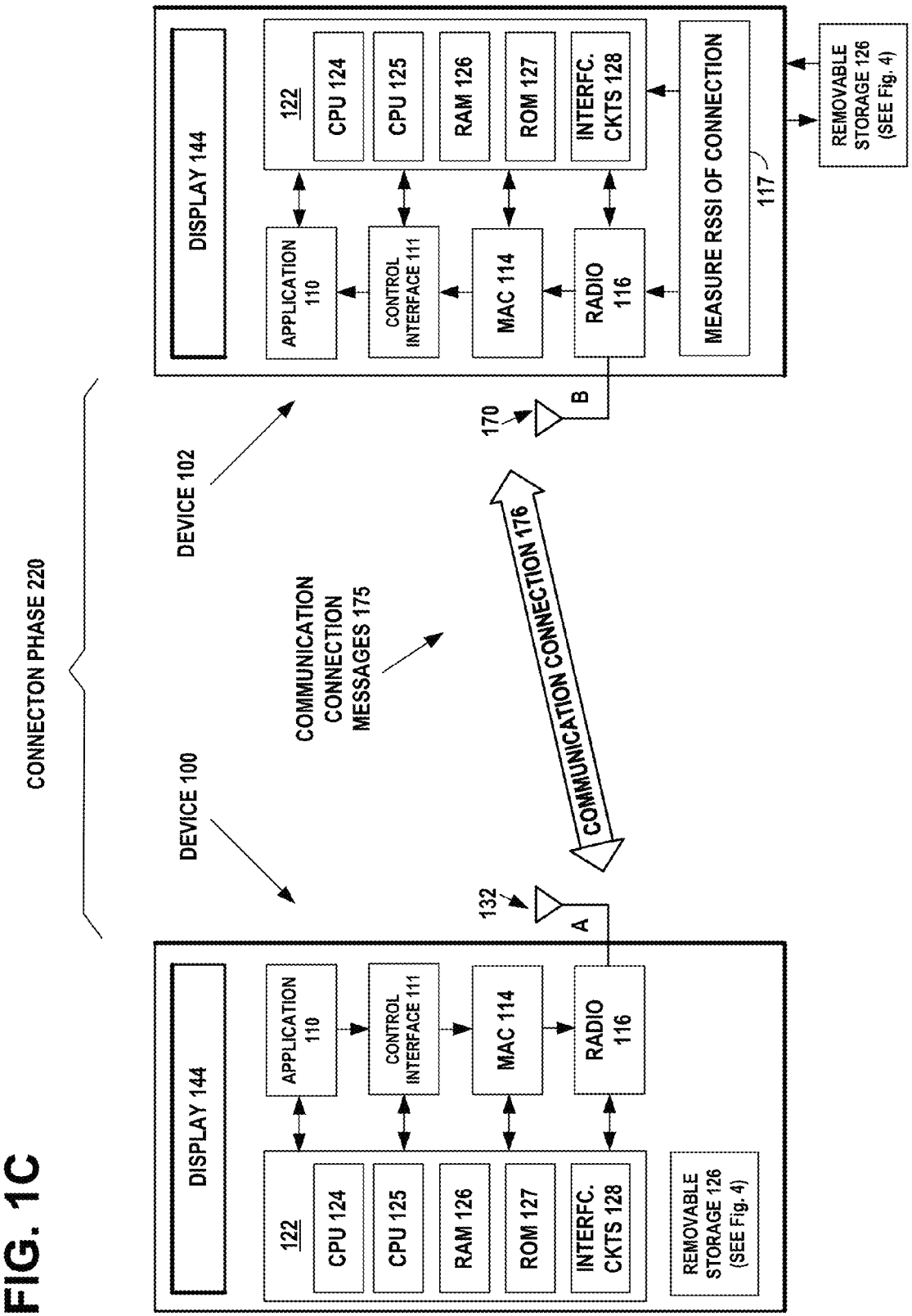
FIG. 1C is an illustration of an example embodiment of the network of FIG. 1B, in the connection phase after the discovery phase has been completed and the wireless communication has been established, showing the first device receiving wireless communication messages over the wireless communication connection from the second wireless device, and after a delay interval, the first device measuring the power level of the received communication messages, and disconnecting the wireless communication connection with the second wireless device, if the wireless communication messages received over the wireless communication connection, have a measured power level greater than a second threshold value, in accordance with at least one embodiment of the present invention.

FIG. 1C is an illustration of an example embodiment of the network of FIG. 1B, in the connection phase 220 after the discovery phase 200 has been completed and the wireless communication has been established. In the Bluetooth communications protocol, a communication connection 176 is formed as a piconet, with the inquiry scanning device 100 becoming the slave device 100 and the inquiring device 102 becoming the master device 102 in the piconet.

The master device 102 receives wireless communication messages 175 over the wireless communication connection 176 from the slave device 100. After a delay interval, the master device 102 measures the power level of the received communication messages 175. The master device 102 may disconnect the wireless communication connection 176 with the slave device 100, if the wireless communication messages 175 received over the wireless communication connection 176, have a measured power level greater than a second threshold value Th2, in accordance with at least one embodiment of the present invention.

In an example embodiment of the invention, after the discovery phase 200 is completed, once the Bluetooth master device 102 is connected to another Bluetooth device, such as the slave device 100, the received signal strength indication (RSSI) may be used in the receiving master device 102 to monitor the received power level of the data communication packets 175 received over the connection 176. The RSSI value is calculated by the Bluetooth physical layer or radio 116. RSSI value may be requested with Read RSSI Command, for example approximately once per second, and may be read by the host application 110 through the host controller interface (HCI) 111 Read RSSI command.

The Read RSSI Command will read the value of the received signal strength indication (RSSI) for data communication packets 175 received over the connection 176 from the slave device 100. The RSSI value is referenced with respect to a Connection_Handle that identifies the connection 176 and is assigned by the master device 102 when the connection 176 is created. The Connection_Handle is used by the Bluetooth radio 116 to determine which set of buffers to use and the logical link over which the communication connection messages 175 are to be sent.

The RSSI parameter in the Read RSSI command is a signed 8-bit value, and is interpreted as an indication of how many dBs the received signal strength is above or below the Golden Receive Range. This command reads the Received Signal Strength Indication (RSSI) value from the radio 116 in the master device 102. For a Basic Rate/Enhanced Data Rate (BR/EDR) radio 116, a Connection_Handle is used as the Handle command parameter and return parameter. The RSSI parameter returns the difference between the measured Received Signal Strength Indication (RSSI) and the limits of the Golden Receive Power Range for a connection 176. The Connection_Handle must be a Connection_Handle for an ACL connection. Any positive RSSI value returned by the radio 116 indicates how many dB the RSSI is above the upper limit, any negative value indicates how many dB the RSSI is below the lower limit. The value zero indicates that the RSSI is inside the 20 dB-wide Golden Receive Power Range. The accuracy of the dB values will depend on the Bluetooth hardware. The only requirements for the hardware may be that the BR/EDR radio 116 is able to tell whether the RSSI is inside, above or below the Golden Device Power Range. The RSSI measurement compares the received signal power with two threshold levels, which define the Golden Receive Power Range. The lower threshold level corresponds to a received power between −56 dBm and 6 dB above the actual sensitivity of the receiver in the radio 116. The upper threshold level is 20 dB above the lower threshold level to an accuracy of +/−6 dB. The meaning of the RSSI metric is an absolute receiver signal strength value in dBm to ±6 dBm accuracy. If the RSSI cannot be read, the RSSI metric is set to 127. (When the Read_RSSI command has completed, an HCI Command Complete event is generated by the radio 116 and sent to the host application 110.)

In an example embodiment of the invention, the master device 102 may invoke an operation, such as disconnecting the wireless communication connection 176 with the slave device 100, if the wireless communication messages 175 received over the wireless communication connection 176, have a measured power level greater than a second threshold value Th2, in accordance with at least one embodiment of the present invention.

In an example embodiment of the invention, the inquiring device 102 in the device discovery phase 200, may store an identity of the wireless communication connection 176 after selecting the one of the one or more responding wireless devices 100, to enable identifying the wireless communication connection 176 of the selected wireless device 100 during the connection phase 220, when measuring the power level of the received data communication messages 175.

In an example embodiment of the invention, the master device 102 may delay the measuring of the power level of the one or more wireless communication messages 175 for a timed interval, for example 15 seconds, in order to avoid prematurely disconnecting the connection 176 while the two devices are being separated.

In an example embodiment of the invention, the master device 102 may delay the measuring of the power level of the one or more wireless communication messages 175 until after the measured power level is less than at most, a certain threshold value, in order to avoid prematurely disconnecting the connection 176 while the two devices are being separated.

In an example embodiment of the invention, the master device 102 may store a first connection handle associated with the wireless communication connection 176 after selecting the one of the one or more responding wireless devices 100, and start a second connection handle referenced to the wireless communication connection 176, for association with the measuring the power level of the received one or more wireless communication messages 175. For example, connection handle used to measure the RSSI may also be a dedicated connection handle that has been set up to measure the RSSI for disconnection of the connection 176. For example, an advanced audio distribution profile (A2DP) connection may use this connection handle for the RSSI measurement for disconnection of the connection 176, but a second connection may be started in addition to A2DP for the sole reason of tracking the RSSI on that second connection handle. In another example, the connection handle being monitored for RSSI may be an Asynchronous Connection-oriented Logical transport (ACL) connection, and a second handle may be required to use as a control channel for a Synchronous connection-oriented (SCO) link to a headset, for encoded voice data in reserved timeslots of the ACL connection.

In an example embodiment of the invention, the device may also allocate multiple handles or connections to a selected device to more accurately measure the RSSI between the devices. For example, the frequency level notches may be ignored when there are multiple measurements between the devices. In an example embodiment of the invention, one handle may be used and the RSSI may be read over this one handle multiple times so that the RSSI level may be smoothen out.

In an example embodiment of the invention, the first threshold value and the second threshold value may be referenced with respect to a preferred receive power range, such as the Golden Receive Power Range. The RSSI measurement may compare the received signal power with two threshold levels, which define the Golden Receive Power Range. The lower threshold level corresponds to a received power between −56 dBm and 6 dB above the actual sensitivity of the receiver. The upper threshold level is 20 dB above the lower threshold level to an accuracy of +/−6 dB. For power measurement in the inquiry phase, the host receives an RSSI that is an absolute value, in units of dBm. In the connected phase, the host receives an RSSI that is a relative value, that is a difference in dB when compared to Golden Receive Power Range.

In another example embodiment of the invention, the first threshold value and the second threshold value may be the same.

In an example embodiment of the invention, a user may wish to transmit audio streaming from a Bluetooth-enabled mobile player device into a Bluetooth-enabled speaker. In an example embodiment of the invention, the mobile player device may use the Advanced Audio Distribution Profile (A2DP) that defines how audio may be streamed from one device to another over a Bluetooth connection. The mobile player device may be the inquiring device 102 that may initiate the streaming of audio messages 175 to the speaker 100, the inquiry scanning device 100, by touching the mobile player device 102 to the speaker 100 in the discovery phase 200.

When the mobile player device 102 is bought near the speaker 100 during the discovery phase 200, the measured RSSI of the inquiry response messages 158 from the speaker 100 may exceed a first threshold and the mobile player device 102 may select the speaker 100 for connection in a piconet. The speaker 100 then becomes the slave in a piconet with the mobile player device 102 becoming the master in the connection phase 220.

In the Advanced Audio Distribution Profile (A2DP), the audio stream is transmitted from the player device 102 to the speaker device 100 and acknowledgement messages 175 are transmitted from the speaker device 100 to the mobile player device 102. In accordance with an embodiment of the invention, it may be, for example, the acknowledgement messages 175 that are measured for their RSSI in the connection phase 220.

After the audio connection 176 is established between the mobile player device and the speaker, a delay of for example 10-15 seconds is imposed before the player device begins measuring the RSSI of the acknowledgement messages 175, to allow time for the user to move the mobile player device away from the speaker, in order to avoid prematurely disconnecting the connection 176. Alternately, the mobile player device may begin measuring the RSSI of the acknowledgement messages 175 and wait until the measured RSSI value is 0 or negative, indicating that the mobile player device has moved away from the touch range to the speaker. When music is streamed from mobile device into the speaker, the mobile player device is monitoring the RSSI value of the acknowledgement messages 175, for example every 2 seconds. When mobile device is returned to be close to the speaker within the touch range, the measured RSSI value of the acknowledgement messages 175 in the connection 176 becomes positive and when the devices are close enough, the measured RSSI will exceed a set threshold, for example 10 dB. When the measured RSSI of the acknowledgement messages 175 in the connection 176 higher than the threshold, the mobile player may disconnect the connection 176.

FIG. 1D is an illustration of an example embodiment of the invention, of the example process in the device 102 in accordance with at least one embodiment of the present invention. The steps of the flow diagram 180 represent computer code instructions stored in the RAM and/or ROM memory of the device 100, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 182: measuring, by an apparatus, a power level of one or more wireless communication messages received from a selected wireless device over a wireless communication connection, after an interval following an establishment of the wireless communication connection; and Step 184: disconnecting, by the apparatus, the wireless communication connection with the selected wireless device, if the one or more wireless communication messages received over the wireless communication connection, has a measured power level greater than a threshold value.

Figure 2A:
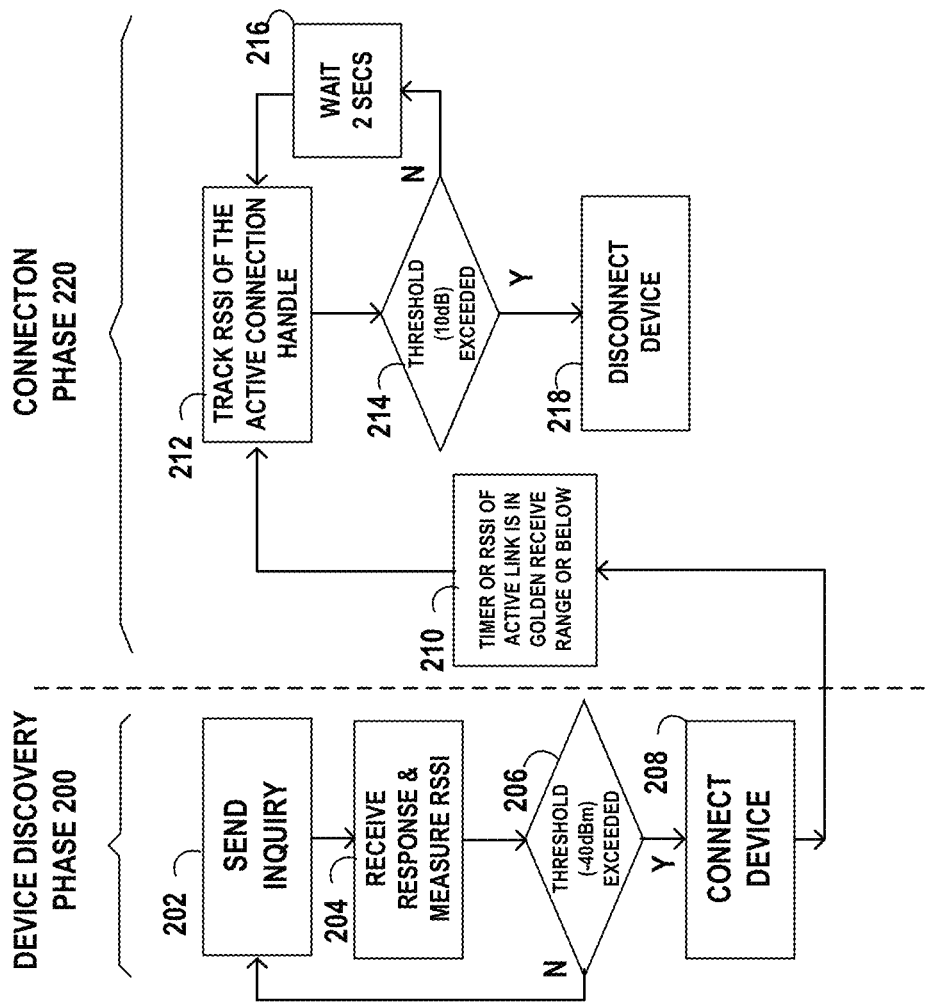
FIG. 2A is an illustration of an example flow diagram of an example implementation of the process in the first device 102, carrying out the example operations in the device discovery phase and the connection phase, using the Bluetooth communications standard, in accordance with at least one embodiment of the present invention.

FIG. 2A is an illustration of an example flow diagram of an example implementation of the process in the first device 102, carrying out the example operations in the device discovery phase 200 and the connection phase 220, using the Bluetooth communications standard, in accordance with at least one embodiment of the present invention. The following is one example embodiment applied to Bluetooth technology.

The flow diagram is divided into the device discovery phase 200 and the connection phase 220.

During the Device Discovery Phase 200:

Step 202: The inquiring device 102 sends an inquiry message 150.

Step 204: The inquiring device 102 receives inquiry responses 158 and/or 160 from the inquiry scanning device 100 and measures the RSSI of the received messages.

Step 206: The inquiring device 102 determines if the measured RSSI is greater than a first threshold value, for example −40 dBm. If the value is greater than the threshold, which indicates that the inquiry scanning device is within the touch distance, then the process passes to step 208, or else if the value is not greater than the threshold, then the process loops back to step 202.

Step 208: The inquiring device 102 establishes a connection 176 with the inquiry scanning device 100.

During the Connection Phase 220:

In the Bluetooth communications protocol, a communication connection 176 is formed as a piconet, with the inquiry scanning device 100 becoming the slave device 100 and the inquiring device 102 becoming the master device 102 in the piconet. (In another example embodiment of the invention, the roles may be the be the opposite).

Step 210: The master device 102 waits for an interval before measuring the power level of wireless communication messages 175 received over the wireless communication connection 176. The interval may be timed by a timer. Alternately, the master device 102 may begin measuring the power level of wireless communication messages 175 received over the wireless communication connection 176 and wait for an indeterminant interval to compare it to a threshold, the interval being the duration required for the measured RSSI of the active link connection 176 to transition to the Golden Receive Power Range or below, which indicates that the inquiry scanning device is farther away than the touch distance.

Step 212: The master device 102 begins tracking the RSSI of the active connection 176, referencing its connection_handle.

Step 214: The master device 102 determines if the measured RSSI is greater than a second threshold value, for example 10 dB, if compared are RSSI reading of the active link which compares this to Golden Receive range. If the value is greater than the threshold, which indicates that the inquiry scanning device has returned to within the touch distance, then the process passes to step 218, or else if the value is not greater than the second threshold, then the process loops through the delay step 216 of approximately 2-seconds, and passes back to step 212.

Step 218: The master device 102 disconnects the connection 176 to the inquiry scanning device.

The disconnection step (218) is one example embodiment of the invention. Other example embodiments of the invention may include the master device announcing to the user that the devices are close to each other, for example by means of a visual display, a vibratory signal, a sound, or the like.

FIG. 2B is an illustration of an example timing diagram of the device discovery process, using the Bluetooth communications standard, in accordance with at least one embodiment of the present invention. The following is one example embodiment applied to Bluetooth technology.

In the Bluetooth specification, during the inquiry procedure, the inquiring device or master device 102 transmits inquiry messages 150 with the general or dedicated inquiry access code. An inquiry response packet (FHS) 158 is transmitted from the inquiry scanning device or slave 100 to the master 102 after the slave has received the inquiry message 150. The device discovery is specified so that the discoverable inquiry scanning device 100 is doing inquiry scan and the inquiring device 102 doing device discovery is in the inquiry state. This means that the inquiring device 102 in inquiry state sends inquiry packets (ID packets) 150, as shown in FIG. 1A, and the discoverable inquiry scanning device 100 scans periodically whether it receives any of the transmitted inquiry packets 150 and responds to those with FHS packets 158, as shown in FIG. 1B. In addition, the discoverable inquiry scanning device 100 may send an Extended Inquiry Response (EIR) packet 160 after the FHS packet 158, as shown in FIG. 1B, to deliver more information about the inquiry scanning device 100. The EIR packet 160 may include for example name of the inquiry scanning device 100 or transmission power.

If the inquiry scanning device 100 transmits an extended inquiry response packet 160, it is transmitted 1250 microseconds after the start of the inquiry response FHS packet 158. The extended inquiry response packet 160 is received by the inquiring device 102 at the hop frequency when the inquiry message received by the inquiry scanning device 100 was first in the master-to-slave slot. The extended inquiry response packet is an Asynchronous Connection-oriented Logical transport (ACL) packet with type DM1, DM3, DM5, DH1, DH3 or DH5.

FIG. 2C is an illustration of an example message format for device discovery messages 150, using the Bluetooth communications standard, in accordance with at least one embodiment of the present invention. During the inquiry procedure, the inquiring device 102 or master transmits inquiry messages 150 with the general or dedicated inquiry access code. The identity or ID packet consists of the inquiry access code (IAC). It has a fixed length of 68 bits. In order to discover other devices the inquiring device 102 may enter inquiry substate where it may repeatedly transmits the inquiry message (ID packet) at different hop frequencies. The inquiry hop sequence is derived from the Lower Address Part (LAP) of the General Inquiry Access Code (GIAC).

FIG. 2D is an illustration of an example message format for inquiry response messages 158, using the Bluetooth communications standard, in accordance with at least one embodiment of the present invention. An inquiry response packet (FHS) 158 is transmitted from the inquiry scanning device 100 or slave to the master after the slave has received an inquiry message 150. The inquiry response packet 158 contains information necessary for the inquiring device 102 to page the slave and follows 625 microseconds after the receipt of the inquiry message 150. The inquiry response packet 158 is received by the inquiring device 102 at the hop frequency when the inquiry message 150 received by the slave was first in the master-to-slave slot. When the inquiry message 150 is received in the inquiry scan substate, the inquiry scanning device 100 may return an inquiry response (FHS) packet 158 containing the recipient's device address (BD_ADDR) and other parameters. If the recipient has non-zero extended inquiry response data to send, it indicates this by the EIT bit 159, indicating that it will return an extended inquiry response packet 160 after the FHS packet 158. On the first inquiry message received in the inquiry scan substate the slave may enter the inquiry response substate. If the slave has non-zero extended inquiry response data to send it may return an FHS packet, with the extended inquiry response bit set to one, to the master 625 microseconds after the inquiry message was received. It may then return an extended inquiry response packet 1250 microseconds after the start of the FHS packet. If the slave's extended inquiry response data is all zeroes the slave may only return an FHS packet with the extended inquiry response bit 159 set to zero.

FIG. 2E is an illustration of an example message format for extended discovery response messages 160, using the Bluetooth communications standard, in accordance with at least one embodiment of the present invention. An Extended Inquiry Response 160 may be used to provide miscellaneous information during the inquiry response procedure. Data types are defined for such things as local name and supported services, information that otherwise would have to be obtained by establishing a connection. The inquiring device 102 that receives a local name and a list of supported services in an extended inquiry response does not have to connect to do a remote name request and a service discovery protocol (SDP) service search, thereby shortening the time to useful information. If the inquiry scanning device 100 transmits an extended inquiry response packet 160, it is transmitted 1250 microseconds after the start of the inquiry response packet 158. The extended inquiry response packet 160 is received by the inquiring device 102 at the hop frequency when the inquiry message 150 received by the inquiry scanning device 100 was first in the master-to-slave slot.

FIG. 2F is an illustration of an example message format for communication connection messages 175, using the Bluetooth communications standard, in accordance with at least one embodiment of the present invention. The standard frame format for Bluetooth systems is illustrated in the figure, which shows the packet contents of the Bluetooth frame. The function of the access code is to identify the packets exchanged within a piconet, where each piconet has a unique access code. The access code is used to synchronize the slaves in a piconet to its master. The main function of the header of the Bluetooth packet is to determine an individual slave address in the piconet by the Logical Transport-Address (LT ADDR). The last part of the Bluetooth frame is the payload. Bluetooth has several types of packets. Asynchronous Connectionless Communications (ACL) packet payload may be one of two types; medium data rate packets and, high data rate packets.

FIG. 3A is an illustration of an example message format for probe request device discovery messages, using the IEEE 802.11 communications standard, in accordance with at least one embodiment of the present invention. In an example embodiment of the invention, the IEEE 802.11 probe request frame is a management frame that is transmitted by a wireless device attempting to quickly locate a wireless local area network (LAN). It may be used to locate independent basic service sets (IBSSs), infrastructure basic service sets (BSSs) or mesh basic service sets (MBSSs) only or any of them. It may be used to locate a wireless LAN with a particular SSID or to locate any wireless LAN. The probe request frame may contain a service attribute request.

For active scans, the wireless device either broadcasts or unicasts a probe request on the channel it is scanning. It may set the SSID in the probe request to a wildcard SSID or to a specific SSID value. It may set the BSSID in the probe request a wildcard BSSID or to a specific BSSID value. With these options the wireless device can look for any SSID or BSSID, any representative of a specific SSID or a specific BSSID. The wireless device will add any received beacons or probe responses to a cached BSSID scan list.

FIG. 3B is an illustration of an example message format for probe response discovery response messages, using the IEEE 802.11 communications standard, in accordance with at least one embodiment of the present invention. The probe response sent back by a wireless device that met the conditions set by the received probe request may contain a timestamp, beacon interval, and capability information. It may also include the SSID of the BSS, supported rates, and PHY parameters.

The effect of receiving a probe request is to cause the wireless device to respond with a probe response if the conditions indicated in the probe request are met. When a wireless device arrives within the communication range of any member of an ad hoc network, its probe request frame inquiry signals are answered by a member of the ad hoc network detecting the inquiry. A device in an ad hoc network that broadcasted the latest beacon in the network responds to the probe request frame inquiry signals with a probe response containing the address of the responding device.

In accordance with an example embodiment of the invention, the inquiring device 102, also referred to as the first device, broadcasts the IEEE 802.11 probe request 150 to the inquiry scanning device 100 also referred to as the second device. In the discovery phase 200, the inquiry scanning device 100 responds by transmitting the IEEE 802.11 probe response 158 to the inquiring device 102.

The IEEE 802.11 physical layer radio 116 delivers the received signal strength indicator (RSSI) parameter to application higher layers 110. The RSSI value is used by the internal circuitry of the radio 116 to determine, for example, if the channel is busy or not during carrier sensing. The RSSI value is an integer with an allowable range of 0-255. The RSSI value is measured in the preamble of the received probe response packet 158 and not continuously during the whole packet transmission. As soon as a preamble is detected, the receiver in radio 116 signals to the MAC layer 114 that there is activity on the wireless channel and it also states the RSSI value that has been detected.

The inquiring device 102 may measure the RSSI of the probe response 158 and compare it to a first threshold value. If the measured RSSI is greater that the first threshold value, then the inquiring device 102 may select the inquiry scanning device 100 and established a connection 176 over which the two devices exchanges IEEE 802.11 data packets 175.

In accordance with an example embodiment of the invention, in the connection phase 220 after the discovery phase 200 has been completed and the wireless connection 176 has been established, the inquiring device 102, also referred to as the first device, exchanges wireless communication messages 175, such as data, music, video, and the like, over the wireless communication connection 176 with the inquiry scanning device 100 also referred to as the second device. After a delay interval following establishment of the connection 176, the first device 102 may measure the power level of the received communication messages 175 from the second device during the connection phase.

The IEEE 802.11 physical layer radio 116 may measure the received signal strength indicator (RSSI) of the data packet 175 and the RSSI parameter may be sent to the application higher layers 110. The RSSI value is measured in the preamble of the received data packet 175 and not continuously during the whole packet transmission. As soon as a preamble is detected, the receiver in radio 116 signals to the MAC layer 114 that there is activity on the wireless channel and it also states the RSSI value that has been detected.

If the wireless communication messages 175 received over the wireless communication connection 176, have a measured power level greater than a second threshold value, then the first device may invoke an operation, such as disconnecting the wireless communication connection 176 with the second wireless device, in accordance with at least one embodiment of the invention.

FIG. 3C is an illustration of an example message format for communication connection messages 175, using the IEEE 802.11 communications standard, in accordance with at least one embodiment of the present invention. In the connection phase after the discovery phase has been completed and the wireless communication has been established, the first device exchanges wireless communication messages 175, such as data, music, video, and the like, over the wireless communication connection with the second wireless device.

FIG. 4 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
measuring, by an apparatus, a power level of one or more wireless messages received from one or more wireless devices;
establishing, by the apparatus, a wireless communication connection with a selected wireless device, the selected wireless device being one of the one or more wireless devices, if the one or more wireless messages received from the selected wireless device has a measured power level greater than a first threshold value indicating that the apparatus and the selected device are close to a touching range to each other;
measuring, by the apparatus, a power level of one or more wireless communication messages received from the selected wireless device over the a wireless communication connection, after an interval following the establishment of the wireless communication connection, the measuring of the power level of the one or more wireless communication messages, indicating that the apparatus and the selected device are greater than a touching range to each other; and
disconnecting, by the apparatus, the wireless communication connection with the selected wireless device, if the one or more wireless communication messages received over the wireless communication connection, has a measured power level greater than a second threshold value, indicating that the apparatus and the selected device are close to a touching range to each other.

2. The method of claim 1, further comprising:
storing an identity of the wireless communication connection after selecting the one of the one or more wireless devices, to enable identifying the wireless communication connection of the selected wireless device when measuring the power level of the received one or more wireless communication messages.

3. The method of claim 1, further comprising:
delaying the measuring of the power level of the one or more wireless communication messages until after the measured power level is less than a threshold value.

4. The method of claim 1, further comprising:
storing a first connection handle associated with the wireless communication connection after selecting the one of the one or more wireless devices, and
starting a second connection handle referenced to the wireless communication connection, for association with the measuring the power level of the received one or more wireless communication messages.

5. The method of claim 1, wherein the threshold value for establishing the wireless communication connection and the threshold value for disconnecting the wireless communication connection are the same.

6. The method of claim 1, wherein the threshold value for establishing the wireless communication connection and the threshold value disconnecting the wireless communication connection are referenced with respect to a preferred receive power range.

7. An apparatus, comprising:
at least one processor;
at least one memory including computer program code;
the at least one memory and the computer program code configured to, with the at least one processor, cause the apparatus at least to:
measure a power level of one or more wireless messages received from one or more wireless devices;
establish a wireless communication connection with a selected wireless device, the selected wireless device being one of the one or more wireless devices, if the one or more wireless messages received from the selected wireless device has a measured power level greater than a first threshold value indicating that the apparatus and the selected device are close to a touching range to each other;
measure a power level of one or more wireless communication messages received from the a selected wireless device over the a wireless communication connection, after an interval following the establishment of the wireless communication connection, the measuring of the power level of the one or more wireless communication messages, indicating that the apparatus and the selected device are greater than a touching range to each other; and
disconnect the wireless communication connection with the selected wireless device, if the one or more wireless communication messages received over the wireless communication connection, has a measured power level greater than a second threshold value, indicating that the apparatus and the selected device are close to a touching range to each other.

8. The apparatus of claim 7, further comprising:
the at least one memory and the computer program code configured to, with the at least one processor, cause the apparatus at least to:
store an identity of the wireless communication connection after selecting the one of the one or more wireless devices, to enable identifying the wireless communication connection of the selected wireless device when measuring the power level of the received one or more wireless communication messages.

9. The apparatus of claim 7, wherein the interval for delaying the measuring of the power level is timed by a timer.

10. The apparatus of claim 7, further comprising:
the at least one memory and the computer program code configured to, with the at least one processor, cause the apparatus at least to:
delay the measuring of the power level of the one or more wireless communication messages until after the measured power level is less than a threshold value.

11. The apparatus of claim 7, wherein the wireless communication connection is one of a Bluetooth connection or an IEEE 802.11 connection.

12. The apparatus of claim 7, further comprising:
the at least one memory and the computer program code configured to, with the at least one processor, cause the apparatus at least to:
store a first connection handle associated with the wireless communication connection after selecting the one of the one or more wireless devices, and
start a second connection handle referenced to the wireless communication connection, for association with the measuring the power level of the received one or more wireless communication messages.

13. The apparatus of claim 7, wherein the threshold value for establishing the wireless communication connection and the threshold value for disconnecting the wireless communication connection are the same.

14. The apparatus of claim 7, wherein the threshold value for establishing the wireless communication connection and the threshold value disconnecting the wireless communication connection are referenced with respect to a preferred receive power range.

15. A computer program product comprising computer executable program code recorded on a computer readable, non-transitory storage medium, the computer executable program code comprising:
code for measuring, by an apparatus, a power level of one or more wireless messages received from one or more wireless devices;
code for establishing, by the apparatus, a wireless communication connection with a selected wireless device, the selected wireless device being one of the one or more wireless devices, if the one or more wireless messages received from the selected wireless device has a measured power level greater than a first threshold value indicating that the apparatus and the selected device are close to a touching range to each other;
code for measuring, by the a-n apparatus, a power level of one or more wireless communication messages received from the a selected wireless device over the a wireless communication connection, after an interval following the establishment of the wireless communication connection, the measuring of the power level of the one or more wireless communication messages, indicating that the apparatus and the selected device are greater than a touching range to each other; and
code for disconnecting, by the apparatus, the wireless communication connection with the selected wireless device, if the one or more wireless communication messages received over the wireless communication connection, has a measured power level greater than a second threshold value, indicating that the apparatus and the selected device are close to a touching range to each other.

16. The computer program product of claim 15, further comprising:
code for storing an identity of the wireless communication connection after selecting the one of the one or more responding wireless devices, to enable identifying the wireless communication connection of the selected wireless device when measuring the power level of the received one or more wireless communication messages.

17. The computer program product of claim 15, further comprising:
   code for delaying the measuring of the power level of the one or more wireless communication messages until after the measured power level is less than a threshold value.

* * * * *